United States Patent
Sakane

(10) Patent No.: US 10,220,679 B2
(45) Date of Patent: Mar. 5, 2019

(54) VEHICLE AIR-CONDITIONING SYSTEM AND STARTING METHOD THEREOF

(71) Applicant: DENSO CORPORATION, Kariya, Aichi-pref. (JP)

(72) Inventor: Hiroyuki Sakane, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 152 days.

(21) Appl. No.: 15/037,019

(22) PCT Filed: Nov. 12, 2014

(86) PCT No.: PCT/JP2014/005669
§ 371 (c)(1),
(2) Date: May 16, 2016

(87) PCT Pub. No.: WO2015/075901
PCT Pub. Date: May 28, 2015

(65) Prior Publication Data
US 2016/0288621 A1   Oct. 6, 2016

(30) Foreign Application Priority Data

Nov. 19, 2013 (JP) .................. 2013-239170
Oct. 31, 2014 (JP) .................. 2014-222505

(51) Int. Cl.
*B60H 1/22* (2006.01)
*B60H 1/32* (2006.01)

(52) U.S. Cl.
CPC ......... *B60H 1/2218* (2013.01); *B60H 1/3205* (2013.01); *B60H 2001/2234* (2013.01); *B60H 2001/2253* (2013.01)

(58) Field of Classification Search
CPC .................. B60H 1/3205; B60H 2001/2253
See application file for complete search history.

(56) References Cited

U.S. PATENT DOCUMENTS 6,745,582 B1 * 6/2004 Urbank ............. B60H 1/00735
236/51
9,090,144 B2 * 7/2015 Momose ............ B60H 1/00428
(Continued)

FOREIGN PATENT DOCUMENTS

JP   H05085153 A   4/1993
JP   H08238924 A   9/1996
(Continued)

*Primary Examiner* — Filip Zec
(74) *Attorney, Agent, or Firm* — Harness, Dickey & Pierce, P.L.C.

(57) ABSTRACT

This vehicle air-conditioning system is provided with a preliminary operation control means which activates preliminary operation equipment in response to a planned-boarding signal. The preliminary operation control means provides preparatory control which precedes basic control. An air-flow switching control means drives a blower motor for just a prescribed short time period, and stops the blower motor. An air-outlet switching control means sets an air outlet in a position other than a face blowing position, and stands by. A compressor control means drives a compressor for just a prescribed short time period, and stops the compressor. An electric-heater control means allows the passage of current to an electric heater for 10 minutes, and subsequently stops the passage of current to the electric heater.

10 Claims, 11 Drawing Sheets

(56) References Cited

U.S. PATENT DOCUMENTS

| | | | |
|---|---|---|---|
| 2004/0194479 A1 | 10/2004 | Umebayashi et al. | |
| 2009/0133417 A1 | 5/2009 | Egawa | |
| 2010/0235046 A1* | 9/2010 | Proefke | B60H 1/00642 |
| | | | 701/36 |
| 2013/0020046 A1 | 1/2013 | Momose et al. | |
| 2013/0096734 A1 | 4/2013 | Tonegawa et al. | |
| 2014/0067130 A1* | 3/2014 | Pillai | H04L 12/2816 |
| | | | 700/275 |
| 2015/0127215 A1* | 5/2015 | Chatterjee | H04W 4/046 |
| | | | 701/36 |

FOREIGN PATENT DOCUMENTS

| | | |
|---|---|---|
| JP | H09104225 A | 4/1997 |
| JP | H09329087 A | 12/1997 |
| JP | 2000337299 A | 12/2000 |
| JP | 2001105847 A | 4/2001 |
| JP | 2003136933 A | 5/2003 |
| JP | 2004256092 A | 9/2004 |
| JP | 2006298326 A | 11/2006 |
| JP | 2007055315 A | 3/2007 |
| JP | 2008184103 A | 8/2008 |
| JP | 2012011907 A | 1/2012 |
| JP | 2013023048 A | 2/2013 |

* cited by examiner

VEHICLE AIR-CONDITIONING SYSTEM AND STARTING METHOD THEREOF

CROSS REFERENCE TO RELATED APPLICATIONS

This application is a U.S. National Phase Application under 35 U.S.C. 371 of International Application No. PCT/JP2014/005669 filed on Nov. 12, 2014 and published in Japanese as WO 2015/075901 A1 on May 28, 2015. This application is based on and claims the benefit of priority from Japanese Patent Applications 2013-239170 filed on Nov. 19, 2013 and 2014-222505 filed on Oct. 31, 2014. The entire disclosures of all of the above applications are incorporated herein by reference.

TECHNICAL FIELD

The technology disclosed herein relates to a vehicle air-conditioning system for air-conditioning of a vehicle interior, and a method of starting thereof.

BACKGROUND ART

In an existing vehicle air-conditioner configuring a vehicle air-conditioning system, operation of the vehicle air-conditioner is started by turn-on of an ignition switch after entry of a driver. In a known control named pre-air-conditioning control, a vehicle interior is air-cooled or warmed up in a stage before entry of a driver. In a vehicle air-conditioner disclosed in PTL 1, although operation of the vehicle air-conditioner is started after entry of a driver, a predetermined preliminary operation is performed before a regular air-conditioning control.

In the vehicle air-conditioner of PTL 1, after the driver enters a vehicle, a blowoff mode is switched from face blowoff to defroster blowoff that blows off air-conditioning air to a vehicle window for a predetermined time after detection of air-conditioning start.

This keeps the hot air out of the driver face in summer.

When the hot air is no longer blown off, face blowoff is started toward the driver face. In addition, although the elapsed time between the temporary defroster blowoff and the second face blowoff is set as fixed time, for example, 10 sec, the elapsed time may be determined by calculation.

PRIOR ART LITERATURES

Patent Literature

PTL 1: JPH05-85153.

SUMMARY OF INVENTION

In the vehicle air conditioner of PTL 1, although the blowoff mode is switched to the defroster blowoff after entry of a driver for a predetermined time after detection of air-conditioning start to prevent the driver from having a discomfort feeling, time is required for such switching. Some air, which is not sufficiently cooled yet, is inevitably blown to the upper part of the driver during the switching.

Although pre-air-conditioning control, in which a vehicle interior is air-cooled before entry of the driver, comfortably avoids the problem as in PTL 1, if the driver cancels or delays entry, much energy is lost in the pre-air-conditioning control.

Hence, although control is started before entry of a driver instead of controlling the vehicle air-conditioner after entry of the driver, less energy is desirably lost in the control when the driver cancels entry.

An object of the technology disclosed herein is to provide a vehicle air-conditioning system and a method of starting the vehicle air-conditioning system, in each of which although control is started before entry of a driver instead of controlling the vehicle air-conditioner after entry of the driver, less energy is lost in the control when the driver cancels entry.

The content of the patent literature listed in the background art is incorporated herein by reference as an explanation of a technical component described in this description.

A preliminary operation device includes one of a blower motor (4), an outlet motor (5), a compressor (6), and an electric heater (7). The blower motor is to blow off air into a vehicle interior. The outlet motor (5) is to switch an outlet blowing off air into the vehicle interior. The compressor discharges a refrigerant for air-conditioning of the vehicle interior. The electric heater warms up the vehicle interior when a current is applied thereto.

A preliminary operation control step includes one of a blower air-volume switching control step, an outlet switching control step (12), a compressor control step (13), and an electric-heater control step (14).

The blower air-volume switching control step includes the blower motor as the preliminary operation device. When the blower motor is included, time is set for the blower air-volume switching control step, the time being necessary for the blower motor to freshen air in an air-conditioning duct. The time is beforehand set as blower drive time (T1). The blower motor is driven for the blower drive time to exhaust air from the air-conditioning duct to the outside, and is then stopped.

When the outlet motor is included as the preliminary operation device, the outlet switching control step sets an outlet, which is an exit of air blown off through operation of the blower motor, at a position other than a position of face blowoff blowing off the air toward a driver face. After such setting, the outlet switching control step is held on standby while applying no current to the blower motor.

When the compressor is included as the preliminary operation device, time is set for the compressor control step, the time being necessary for the compressor to discharge a liquid refrigerant in the compressor. The time is beforehand set as compressor drive time (T2). The compressor is driven for the compressor drive time to discharge the liquid refrigerant from the compressor, and is then stopped.

When an electric heater is included as the preliminary operation device, the electric-heater control step applies a current to the electric heater for a beforehand set electric-heater operation time (T3) to warm up a vehicle interior, and then stops the current application to the electric heater.

The vehicle air conditioner can be partially operated by such modules before entry of a driver to prepare for regular air-conditioning control after entry of the driver.

In an existing typical pre-air-conditioning control, one of drive of the blower motor, drive of the outlet motor, drive of the compressor, and current application to the electric heater is also performed in order to set up a comfortable environment in a vehicle interior before driver entry. However, the blower drive time is different from the pre-air-conditioning control, because it is set as time necessary to freshen the air in the air-conditioning duct. The outlet-motor preliminary operation control is different from the pre-air-conditioning control in that the outlet is set at the position other than the face blowoff position, and then the outlet-motor preliminary operation control is held on standby while applying no current to the blower motor.

The preliminary operation control for liquid refrigerant discharge is different from the pre-air-conditioning control in that the compressor drive time is set as time necessary to discharge the liquid refrigerant from the compressor.

Current application to the electric heater is also different from the existing pre-air-conditioning control in that electric-heater operation time is relatively short. The electric-heater operation time is different from the existing pre-air-conditioning control in that it is beforehand set. Hence, even if a driver cancels entry while one of the preliminary operation controls is performed based on a driver entry plan, less energy is lost.

Consequently, it is possible to provide a method of starting a vehicle air-conditioning system, in which although the preliminary operation control is started before entry of a driver instead of starting control by the vehicle air-conditioner after entry of a driver, less energy is lost in the preliminary operation control when the driver cancels entry.

In one of the techniques disclosed herein, the vehicle air-conditioning system includes an entry detection module that detects possible entry of a driver and transmits an entry plan signal. The vehicle air-conditioning system further includes a preliminary operation device including some of a vehicle air-conditioner performing air-conditioning of a vehicle interior with air-conditioning air passing through an air-conditioning duct. The vehicle air-conditioning system further includes a preliminary operation control module that notices the entry plan signal and operates the preliminary operation device. In addition, the vehicle air-conditioning system includes a basic control module (200) that controls the vehicle air-conditioner in response to entry of a driver.

The preliminary operation control module can start some of the vehicle air-conditioner before entry of a driver to prepare for a regular air-conditioning control after entry of the driver. Hence, even if a driver cancels entry while one of the preliminary operation controls is performed based on a driver entry plan, less energy is lost. Consequently, it is possible to provide a vehicle air-conditioning system, in which although the preliminary operation control is started before entry of a driver instead of controlling the vehicle air-conditioner after entry of the driver, less energy is lost in the preliminary operation control when the driver cancels entry.

The numeral or explanation in a parenthesis described in each of claims and on each of the modules is merely an example to simply show the correspondence relationship with the specific module in each embodiment described later, and does not limit the content of the disclosure.

DESCRIPTION OF EMBODIMENTS

Hereinafter, some embodiments are described with reference to the accompanying drawings. In each embodiment, a portion corresponding to a matter described in a prior embodiment is designated with the same numeral, and duplicated description may be omitted. When a portion of a configuration of one embodiment is described, previous description of another embodiment can be applied to other portions of the configuration.

The embodiments can be partially combined with each other not only in portions that are specified to be combinable, but even in portions that are not specified to be combinable if they can be combined without any trouble.

First Embodiment

Figure 1:
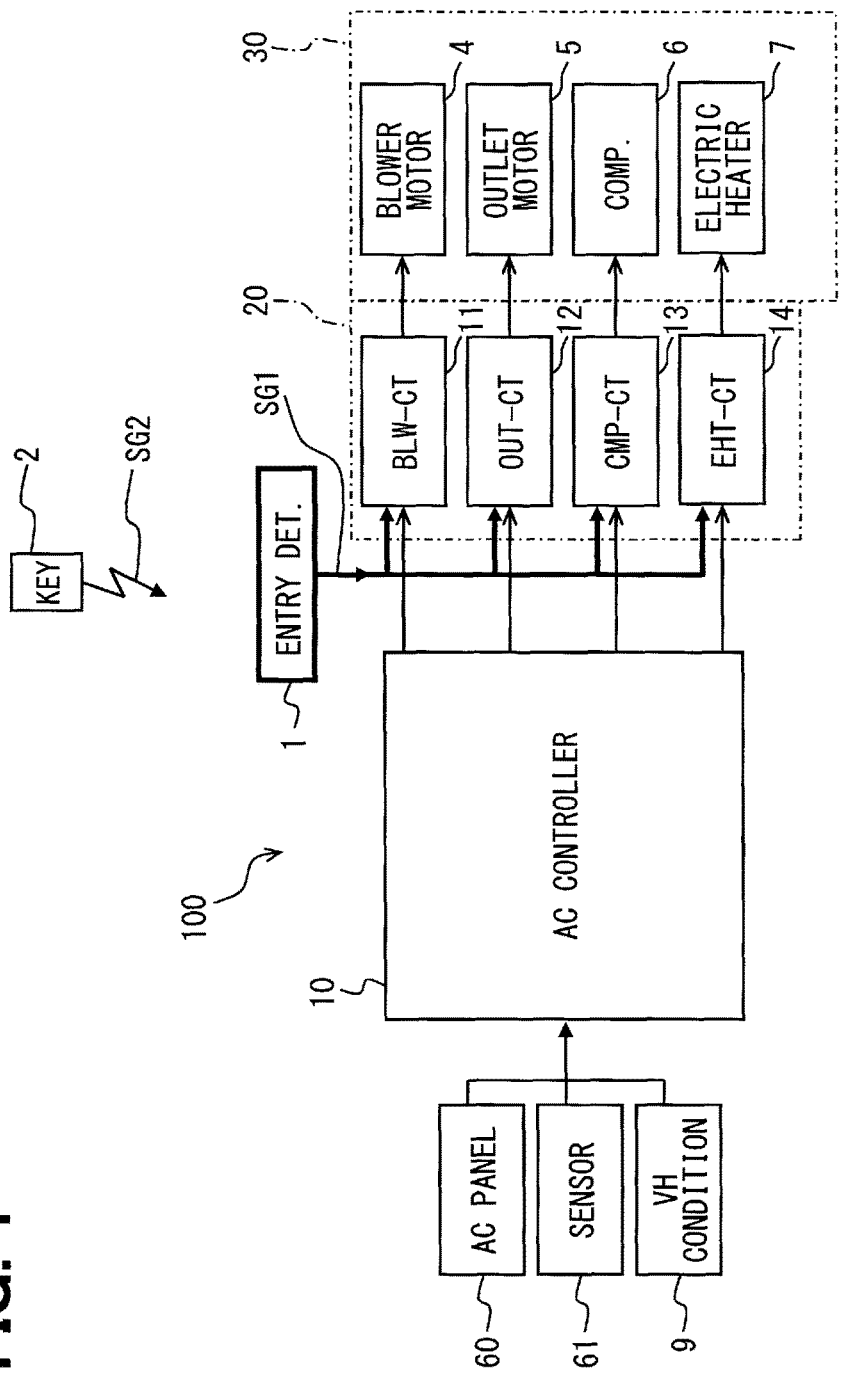
FIG. 1 is a block diagram of a vehicle air-conditioning system of a first embodiment.

FIG. 1 illustrates a vehicle air-conditioning system of a first embodiment. The vehicle air-conditioning system includes an entry detection module (ENTRY DET) 1 that detects possible entry of a driver before actual entry of the driver and transmits an entry plan signal SG1. The entry detection module 1 is configured of a wireless door locking/unlocking unit. The entry detection module 1 transmits the entry plan signal SG1 in response to a radio signal SG2 from a wireless key (KEY) 2. The wireless key 2 allows locking or unlocking of a door of a vehicle at a location away from the vehicle. The entry detection module 1 detects a preliminary event indicating a probable entry of a driver within a short period before actual entry of the driver, and thereby outputs the entry plan signal SG1. For example, the preliminary event is an entry preparation action. The preliminary event can be selected such that time before actual entry following the preliminary event is equal to or shorter than a period allowing preliminary operation control described later to be completed within the period, and allowing the effect of the preliminary operation control to be maintained for the period.

A driver operates the wireless key 2 at a position somewhat away from the vehicle. This allows a vehicle door to be wirelessly unlocked. Such an unlocking signal is supplied as the entry plan signal SG1 to a control circuit configuring a preliminary operation control module 20.

The vehicle air-conditioning system includes some of a vehicle air-conditioner (AC-ECU) 100 performing air-conditioning of a vehicle interior, and includes at least one preliminary operation device 30 that operates before driver entry. The vehicle air-conditioning system includes a blower motor (BLOWER MOTOR) 4, as one of the preliminary operation devices 30, that drives a blower that blows off air from an air-conditioning duct of the vehicle air-conditioner into a vehicle interior. The vehicle air-conditioning system further includes an outlet motor (OUTLET MOTOR) 5, as one of the preliminary operation devices 30, as a component of an outlet servo mechanism that switches an outlet blowing off air-conditioning air into the vehicle interior. The vehicle air-conditioning system further includes a compressor (COMP.) 6, as one of the preliminary operation devices 30, which circulates a refrigerant through a heat exchanger to operate a refrigerating system. The vehicle air-conditioning system further includes an electric heater (EL HEATER) 7, as one of the preliminary operation devices 30, which supplementarily heats the vehicle interior.

The vehicle air-conditioning system includes the preliminary operation control module 20 that operates at least one of the preliminary operation devices 30 in response to the entry plan signal SG1 from the entry detection module 1. The preliminary operation control module 20 includes a blower air-volume switching control module (BLW-CT) 11 configured of an electric circuit in a circuit board having relays for controlling current application to the blower motor 4.

The preliminary operation control module 20 provides preliminary operation control that is a preparatory control for subsequent basic control. The basic control provides air-conditioning until the vehicle interior reaches a comfortable level. The preliminary operation control can be set so as not to provide air-conditioning of the vehicle interior. The preliminary operation control may exhibit a slight air-conditioning effect. The air-conditioning effect by the preliminary operation control is extremely smaller than that by the basic control. The preliminary operation control can be set such that a state of the air conditioner is changed from a suspension state to a nearly basic control state. The preliminary operation control may be set such that its preparatory effect is maintained over a predetermined period even after finish of power supply to devices. The preliminary operation control may be selected such that the control is completed within a typical standby period before actual entry of a driver after transmission of the entry plan signal SG1, and the preparatory effect of the control is maintained over the standby period. For example, short-term current application to the blower motor 4 provides ventilation in the blower. Such a ventilation effect is continued for at least a short period. For example, short-term current application to the outlet motor 5 changes an outlet into a desirable state. In addition, such a desirable outlet state is continued after the change. For example, short-term current application to the compressor 6 changes a refrigerant in the compressor 6 into a desirable state. Such a desirable refrigerant state is continued for a short period. For example, current application to the electric heater 7 preheats the electric heater 7. Such a preheating effect is continued for a short period.

The preliminary operation control module 20 includes an outlet switching control module (OUT-CT) 12 configured of an electric circuit in a circuit board having relays that control current application to the outlet motor 5. The preliminary operation control module 20 includes a compressor control module (CMP-CT) 13 configured of an electric circuit in a circuit board having relays that control current application to the compressor 6. The preliminary operation control module 20 includes an electric-heater control module (EHT-CT) 14 configured of an electric circuit in a circuit board having relays that control current application to the electric heater 7.

The preliminary operation device 30 includes the blower motor 4 to blow off air into the vehicle interior, and the outlet motor 5 as a servo motor in an outlet switcher that switches an outlet blowing off air into the vehicle interior. The preliminary operation device 30 further includes the compressor 6 integrally provided with a compressor drive motor to discharge the refrigerant for air-conditioning of the vehicle interior. The preliminary operation device 30 includes an electric heater 7 that warms up the vehicle interior when a current is applied thereto.

The blower air-volume switching control module 11 is mounted in the circuit board. The blower air-volume switching control module 11 drives the blower motor 4 for a beforehand set blower drive time T1 (3 to 10 sec) as calculation time to exhaust air from the air-conditioning duct to the outside, and then stops the blower motor 4. The blower drive time T1 is calculated from volume and volume air volume per unit time of the air-conditioning duct 22, and is beforehand set. In other words, the blower drive time T1 corresponds to time necessary for exhausting air from the air-conditioning duct to the outside at a blower air volume for the preliminary operation control.

A method of starting the vehicle air-conditioning system includes a plurality of steps. In the starting method, a function provided by the driver detection module 1 may be referred to as driver detection step. In the starting method, a function provided by the preliminary operation control module 20 may be referred to as preliminary operation control step. In the starting method, a function provided by the blower air-volume switching control module 11 may be referred to as a blower air-volume switching control step. In the starting method, a function provided by the outlet switching control module 12 may be referred to as outlet switching control step. In the starting method, a function provided by the compressor control module 13 may be referred to as compressor control step. In the starting method, a function provided by the electric-heater control module 14 may be referred to as electric-heater control step.

Figure 2:
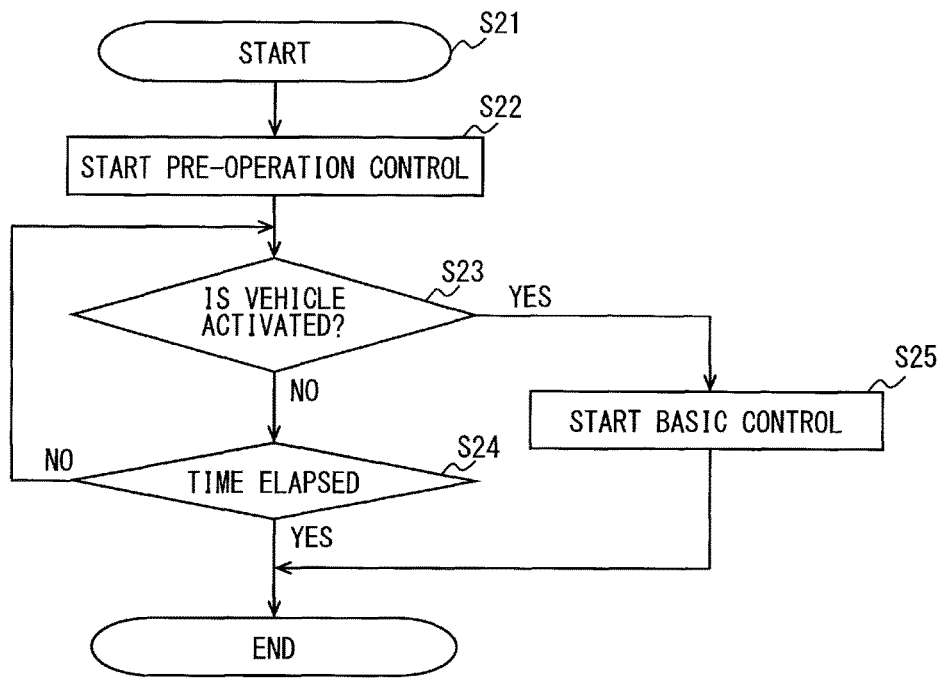
FIG. 2 is a flowchart of preliminary operation control.

The preliminary operation control is described with reference to FIG. 2. In step S21 of FIG. 2, when the entry detection module 1 receives an unlocking signal from the wireless key 2, the illustrated process is started. Specifically, the preliminary operation control module 20 detects the entry plan signal SG1 in step S21. In step S22, the preliminary operation control module 20 starts the preliminary operation control for the preliminary operation device 30 in response to the entry plan signal SG1 from the entry detection module 1. In such a case, a predetermined voltage is applied to the blower motor 4 to rotate a blower.

In step S23, the preliminary operation control module 20 determines whether a driver enters and activates a vehicle. The preliminary operation control module 20 determines whether an ignition switch (also referred to as driving switch) for activating the vehicle is turned on, and thus performs vehicle activation. For example, the vehicle activation can be determined based on determination on whether a voltage is applied via the ignition switch. When the ignition switch is not turned on, the preliminary operation control module 20 determines whether a timer reaches the end in step S24. In other words, the preliminary operation control module 20 determines whether a predetermined time measured by the timer has elapsed.

Time before timer end is set to the blower drive time T1 (3 to 10 sec) as the calculation time. In this exemplary case, the time is set to 4 sec. Over 4 sec after reception of the entry plan signal SG1, the blower motor 4 is rotated, so that humidity or odorful air in the air-conditioning duct is exhausted to the outside and diffused in the vehicle interior.

After a lapse of 4 sec, the preliminary operation control module 20 stops the blower motor 4, and finishes the preliminary operation control for the blower motor 4. The blower air-volume switching control module 11 can be provided in a circuit board having relays that control current application to the blower motor 4, or in a circuit board that controls speed of the blower motor 4.

In some case, a driver enters and activates the vehicle before timer end. In such a case, the ignition switch is turned on. In this case, operation of the basic control module as the regular operation of an air-conditioning controller 10 is started in step S25, and the preliminary operation control for the blower motor 4 is finished.

Figure 3:
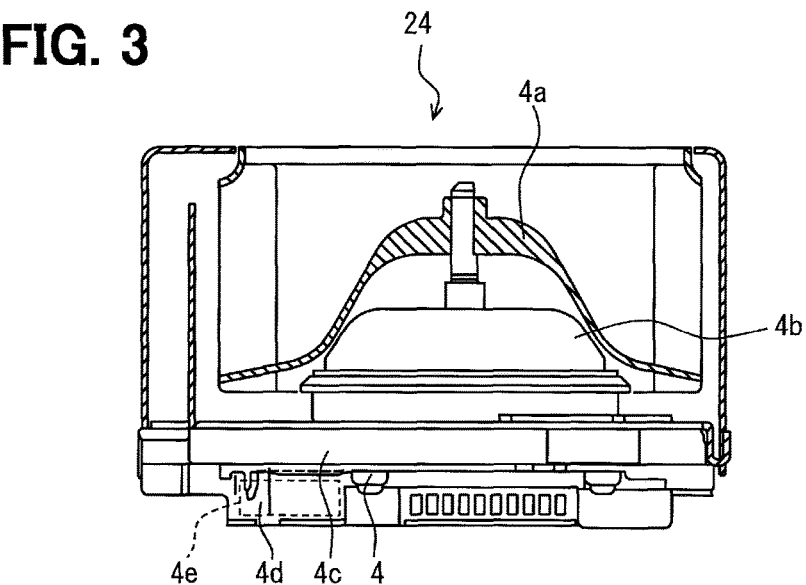
FIG. 3 is a partial section view illustrating a blower and a blower motor.

A blower 24 and the blower motor 4 are described with reference to FIG. 3. A brushless motor configuring the blower motor 4 includes an outer-rotor-type motor body 4b that rotatably drives a centrifugal fan 4a, and a motor-controlling circuit board 4e for controlling the motor body 4b. The brushless motor further includes a motor holder 4c holding the motor body 4b, and a circuit casing 4d internally accommodating the motor-control circuit board 4e.

The motor body 4b includes a stator fixed to the motor holder 4c, and a rotor provided on the outer circumference of the stator. The circuit board 4e is fixed to one end surface (bottom in FIG. 3) of the motor holder 4c by a plurality of screws. The circuit board 4e has thereon a plurality of undepicted control elements and chalk coils configuring an exciting circuit for supplying an exciting current to a stator coil. An output transistor that outputs the exciting current to the stator coil is disposed in an end portion of the circuit board 4e. The electric circuit of the blower air-volume switching control module 11 as a component of the preliminary operation control module 20 is mounted on the circuit board 4e.

The preliminary operation control for the outlet motor 5 is now described. A flowchart of this control is described with reference to FIG. 2. In step S21 of FIG. 2, a door locking unit receives an unlocking signal from the wireless key 2. In step S22, the preliminary operation control module 20 starts the preliminary operation control for the outlet motor 5 to switch the outlet in response to the entry plan signal SG1 from the door locking unit configuring the entry detection module 1.

A plurality of switching doors to open or close outlets such as a face outlet, a foot outlet, and a defroster outlet are each provided with the outlet motor 5 as a servo motor for the outlet. If a position of the switching door driven by the outlet motor 5 is set at a position of a face blowoff mode blowing off air-conditioning air toward a driver face, the preliminary operation control module 20 drives the outlet motor 5 at a position other than the face blowoff position. For example, the preliminary operation control module 20 sets the outlet mode to a defroster blowoff mode blowing off air-conditioning air to a windowpane.

If the position is set to the face blowoff mode, the switching door for the face outlet is closed by the outlet motor 5, and the switching door for the defroster outlet is opened by the outlet motor 5.

Subsequently, the preliminary operation control module 20 performs the above-described steps S23, S24, and S25. Time before timer end for the outlet motor 5 is set to 5 sec. Regardless of whether the timer reaches the end, the outlet motor 5 is stopped by operation of a limit switch when the switching door arrives at a predetermined position as well known.

The preliminary operation control for the compressor 6 is now described. A flowchart of the preliminary operation control for the compressor is described with reference to FIG. 2. When the door locking unit receives the unlocking signal from the wireless key 2 in step S21 of FIG. 2, the preliminary operation control module 20 starts the preliminary operation control for the compressor 6 in response to the entry plan signal SG1 in step S22.

The compressor 6 is an electromotive compressor. The compressor 6 circulates a refrigerant for a refrigerating cycle through refrigerant piping. Subsequently, the preliminary operation control module 20 performs the above-described steps S23, S24, and S25. The compressor drive time T2 (2 to 10 sec) set for the compressor 6 is set as time before timer end for the compressor 6. In the first embodiment, the compressor drive time T2 is set to 3 sec. The compressor drive time T2 is calculated from the volume and discharge volume per unit time of the compressor 6, and is set as time necessary for discharging the liquid refrigerant in the compressor 6. Specifically, the compressor 6 is operated for the beforehand calculated time according to a state of the compressor 6. This minimizes operation time of the preliminary operation device, and reduces energy loss if the preliminary operation becomes useless.

The preliminary operation control module 20 rotates the compressor 6 for 3 sec after reception of the entry plan signal SG1. This allows the liquid refrigerant in the compressor 6 to be discharged into an external refrigerant piping. After a lapse of 3 sec, the preliminary operation control module 20 stops the compressor 6 and finishes the preliminary operation control for the compressor 6. The compressor control module 13 that operates the compressor 6 can be provided in a circuit board that controls an inverter driving the compressor 6.

The preliminary operation control for the electric heater 7 is now described. A flowchart of this control is described with reference to FIG. 2. When the door locking unit receives the unlocking signal from the wireless key 2 in step S21 of FIG. 2, the preliminary operation control module 20 starts the preliminary operation control for the electric heater 7 in response to the entry plan signal SG1 in step S22.

The electric heater 7 supplementarily heats the vehicle interior in winter, and does not operate in other seasons since an undepicted switch is OFF. Subsequently, the preliminary operation control module 20 performs the above-described steps S23, S24, and S25. Time before timer end for the electric heater 7 is set to the electric-heater operation time T3 (5 to 60 sec) that is beforehand set as time necessary for pre-heating both a heating element and a heat transmitting medium of the electric heater 7. In the first embodiment, the electric-heater operation time T3 is set to 15 sec. The electric-heater control module 14 includes the electric heater 7 as the preliminary operation device 30. In such a case, the preliminary operation control module 20 applies a current to the electric heater 7 only for the electric-heater operation time to warm up the vehicle interior, and then stops the current application to the electric heater 7.

The time necessary for pre-heating both the heating element and the heat transmitting medium of the electric heater 7 must be long in the case of low temperature of the vehicle interior or the electric heater. Specifically, the electric heater is operated for the beforehand calculated time according to a state (temperature) of the electric heater. This minimizes operation time of the preliminary operation device, and reduces energy loss if the preliminary operation becomes useless. The temperature of the electric heater may be estimated from vehicle interior temperature corresponding to atmospheric temperature of the electric heater.

The preliminary operation control module 20 applies a current to the electric heater 7 for 15 sec after reception of the entry plan signal SG1, and thus warms up the driver feet in the vehicle interior. After a lapse of 15 sec, the preliminary operation control module 20 stops the current application to the electric heater 7, and finishes the preliminary operation control for the electric heater 7. The electric-heater control module 14 can be provided in a circuit board on which relays for current application to the electric heater 7 are mounted.

Figure 4:
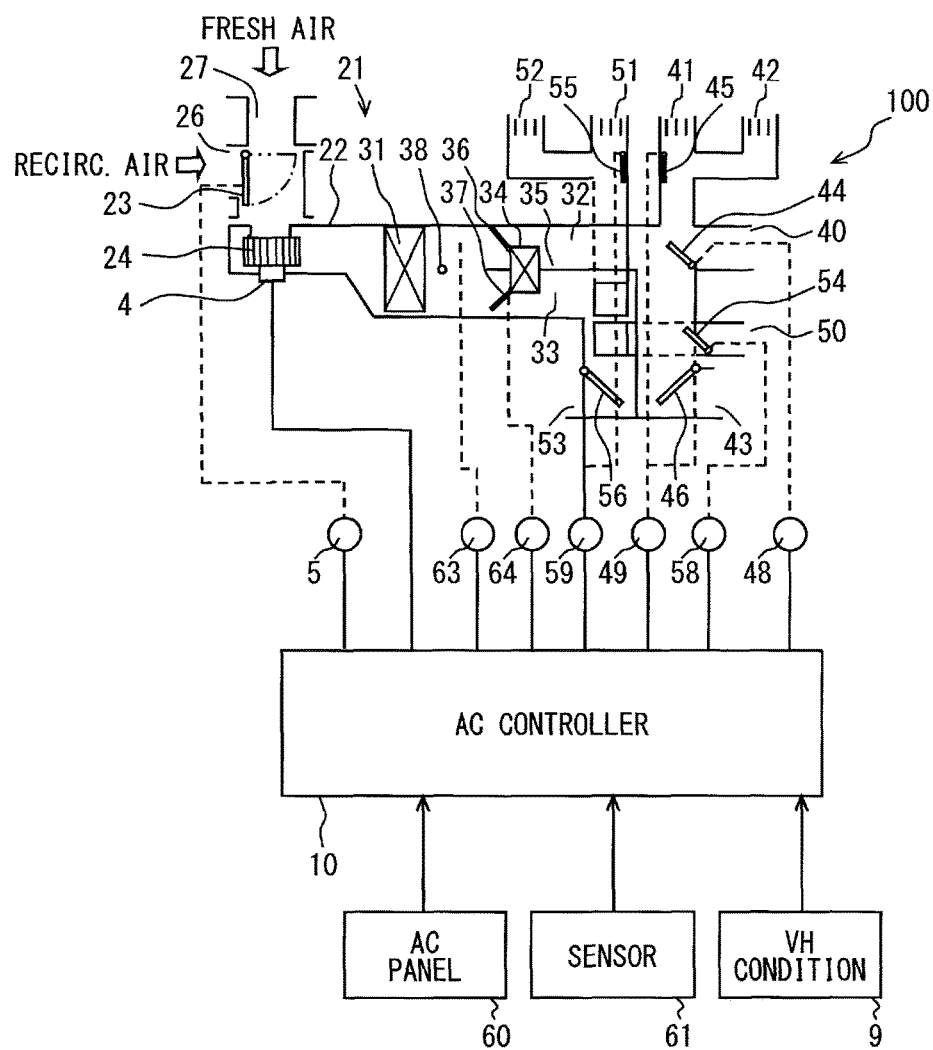
FIG. 4 is a block diagram of a vehicle air-conditioner.
Figure 5:
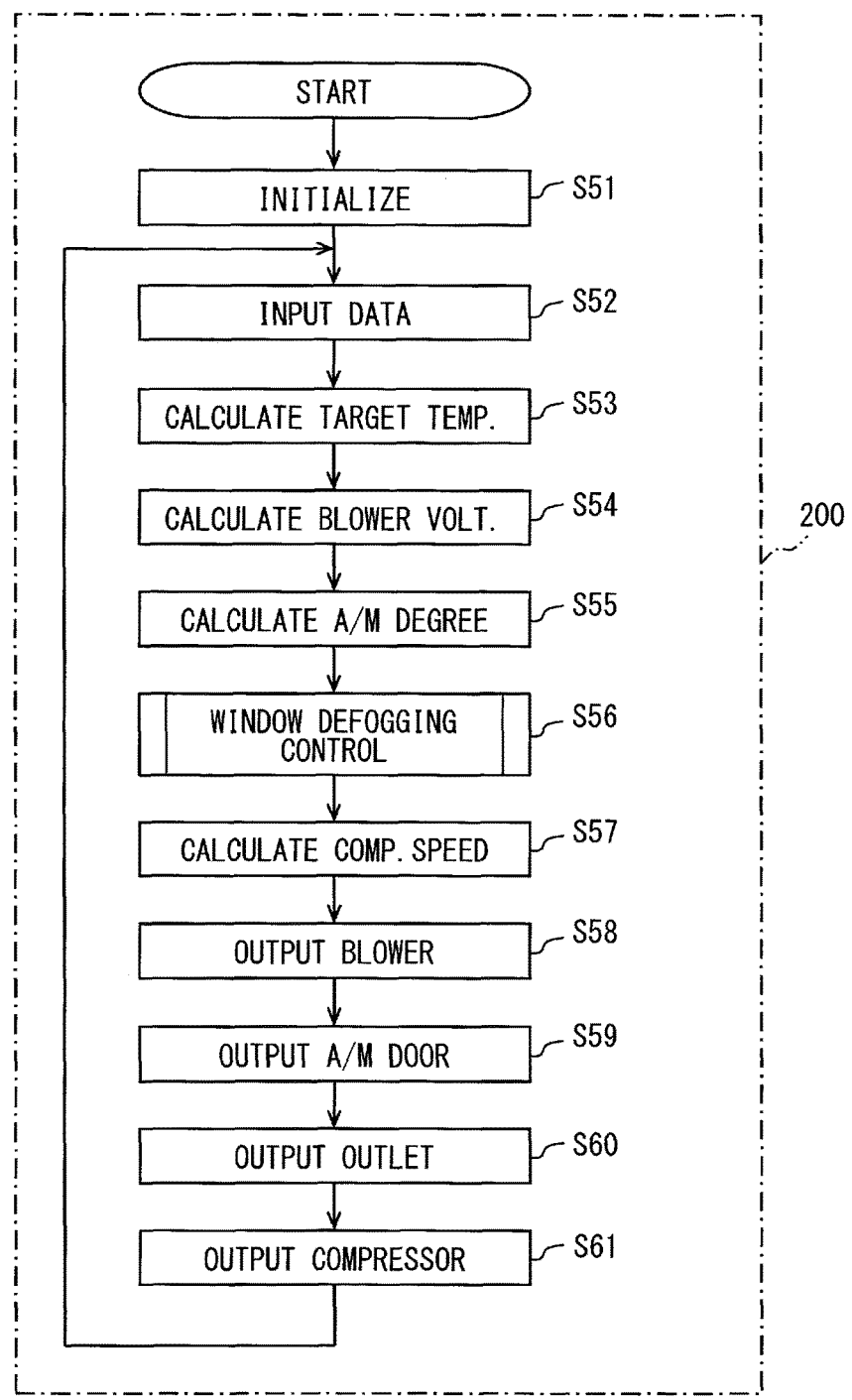
FIG. 5 is a flowchart illustrating basic control.

The operation of the basic control module as the regular operation of the air-conditioning controller 10 following the above-described preliminary operation control is now described with reference to FIGS. 4 and 5. The operation of the basic control module is referred to as regular operation or basic control. FIG. 4 illustrates a vehicle air-conditioner 100 of the first embodiment. FIG. 5 illustrates the basic control module 200 of the air-conditioning controller 10.

The vehicle air-conditioner 100 is adapted to a vehicle such as an automobile having a water-cooled engine for driving. The vehicle air-conditioner 100 is configured such that the vehicle interior is air-conditioned through control of each air-conditioning module (actuator) of an air-conditioning unit 21 for air-conditioning of the vehicle interior.

The air-conditioning unit 21 can perform temperature control, change of the outlet mode, and the like for a driver-seat-side air-conditioning zone containing a rear seat behind a driver seat in a vehicle interior and for a passenger-seat-side air-conditioning zone containing a rear seat behind a passenger seat, independently of each other.

The air-conditioning unit 21 includes the air-conditioning duct 22 disposed on the front side of the vehicle interior. A recirculation/fresh-air switching door 23 and the blower 24 are provided on an upstream side of the air-conditioning duct 22, and configure a blower unit as a recirculation/fresh-air blower module. The recirculation/fresh-air switching door 23 is an inlet switching module that is driven by an actuator such as a servo motor to change a degree of opening of each of a recirculation-air inlet 26 and a fresh-air inlet 27, i.e., a so-called inlet mode.

The blower 24 is rotatably driven by the blower motor 4 to generate an air flow toward the vehicle interior in the air-conditioning duct 22. An evaporator 31 that cools air passing through the air-conditioning duct 22 is provided in a central portion of the air-conditioning duct 22.

A heater core 34, by which air passing through first and second air passageways 32 and 33 is heated through heat exchange with engine cooling water, is provided on an air downstream side of the evaporator 31. The first and second air passageways 32 and 33 are partitioned from each other by a partition board 35.

A driver-seat-side air mix door 36 and a passenger-seat-side air mix door 37, which independently perform temperature control of the driver-seat-side air-conditioning zone and of the passenger-seat-side air-conditioning zone in the vehicle interior, are provided on an air upstream side of the heater core 34.

The driver-seat-side air mix door 36 and the passenger-seat-side air mix door 37 are each driven by an actuator such as a servo motor. While the air-conditioning air is blown off from each of the outlets on a driver seat side and a passenger seat side described later to each of the driver-seat-side air-conditioning zone and the passenger-seat-side air-conditioning zone in the vehicle interior, particularly to the inside of each of the front windows on the driver seat side and the passenger seat side, the temperature of air-conditioning air is thus changed.

The refrigerating cycle includes the compressor 6 that is configured as an electromotive compressor to compress and discharge the refrigerant, and an undepicted condenser that condenses and liquefies the refrigerant discharged from the compressor 6. The refrigerating cycle further includes a receiver that separates the liquid refrigerant inflowing from the condenser into gas and liquid, an expansion valve that adiabatically expands the liquid refrigerant inflowing from the receiver, and the evaporator 31 that vaporizes the refrigerant in the gas-liquid two-phase inflowing from the expansion valve.

The compressor 6 is driven by a compressor drive motor controlled by the air-conditioning controller 10. The compressor 6 is started, and thus the evaporator 31 cools and dehumidifies the air passing through the air-conditioning duct 22.

In the first embodiment, the operational rotation frequency of the compressor 6 is determined based on a control signal output in correspondence to a comparison result between an after-evaporation temperature (TE) as a detection value of an after-evaporation temperature sensor 38 and a target after-evaporation temperature (TEO). A variable volume compressor having an electromagnetic variable volume valve that performs variable volume control can be used in place of the electromotive compressor. In such a case, the degree of opening of a control valve is determined based on the control signal.

As illustrated in FIG. 4, a driver-seat-side defroster outlet 40, a driver-seat-side center face outlet 41, a driver-seat-side side-face outlet 42, and a driver-seat-side foot outlet 43 are each opened at an air downstream end of a blowoff duct in communication with the air downstream side of the first air passageway 32.

A passenger-seat-side defroster outlet 50, a passenger-seat-side center face outlet 51, a passenger-seat-side side-face outlet 52, and a passenger-seat-side foot outlet 53 are each opened at an air downstream end of a blowoff duct in communication with the air downstream side of the second air passageway 33.

The driver-seat-side defroster outlet 40 and the passenger-seat-side defroster outlet 50 configure an outlet to blow off air-conditioning air (mainly warm air) to a front window. The driver-seat-side side-face outlet 42 and the passenger-seat-side side-face outlet 52 configure an outlet to blow off an air-conditioning air to a side window. Driver-seat-side outlet switching doors 44 to 46 and passenger-seat-side outlet switching doors 54 to 56 are provided within the first and second air passageways 32 and 33, respectively, to independently set outlet modes on a driver seat side and a passenger seat side in the vehicle interior. The driver-seat-side and passenger-seat-side outlet switching doors 44 to 46 and 54 to 56 are driven by servo motors 48, 49, 58, and 59. The servo motors 48, 49, 58, and 59 are generally referred to as outlet motor 5. Thus, the outlet switching doors 44 to 46 and 54 to 56 configure an air-volume rate control module including mode switching doors that switch the respective outlet modes on the driver seat side and the passenger seat side.

The respective driver-seat-side and passenger-seat-side outlet modes include a face mode, a bi-level mode, a foot mode, a foot defroster mode, and a defroster mode. The driver-seat-side and passenger-seat-side outlet switching doors 44 and 54 can open or close the driver-seat-side defroster outlet 40 and the passenger-seat-side defroster outlet 50, respectively, independently of each other. The servo motors 48 and 58 driving such doors configure an actuator as a defogging module that performs control effective in preventing or removing fog or frost on a window.

The air-conditioning controller 10 is configured such that when the ignition switch responsible for activation and stop of an engine is turned on (IG •ON) and thus DC power is supplied from an undepicted vehicle-equipped battery as a vehicle-equipped power supply, the air-conditioning controller 10 starts arithmetic processing or a control process. As illustrated in FIG. 1, the air-conditioning controller 10 is configured to receive various switch signals from various operating switches on an air-conditioning control panel (AC PANEL) 60 provided integrally with an instrument panel. The air-conditioning controller 10 receives a vehicle condition signal from a vehicle condition input module (VH CONDITION) 9 including a navigation unit and the like equipped in the vehicle.

The air-conditioning control panel 60 is provided with a liquid crystal display unit, a recirculation/fresh-air switching switch, a front defroster switch, a rear defroster switch, a DUAL switch, an outlet mode switching switch, and a blower air-volume switching switch. The air-conditioning control panel 60 is further provided with an A/C switch, an AUTO switch, an OFF switch, a driver-seat-side temperature setting switch, a passenger-seat-side temperature setting switch, and a fuel economy enhancement switch.

The mode switching switch corresponds to an air-conditioning switch that gives an instruction on whether the defogging capability of the front window is enhanced. The mode switching switch requires that the outlet mode is set to one of the face mode, the bi-level mode, the foot defroster mode, and the foot mode in correspondence to manual operation of a user.

The liquid crystal display is provided with a setting temperature display part that visually displays setting temperature of the air-conditioning zone on each of the driver seat side and the passenger seat side, an outlet mode display part that visually displays the outlet mode, and an air-volume display part that visually displays the blower air volume. The A/C switch is an air-conditioning operating switch that instructs start or stop of the compressor of the refrigerating cycle. Generally, the A/C switch is provided to turn off the compressor to decrease rotational load of an engine so that fuel efficiency is improved.

The driver-seat-side temperature setting switch is a driver-seat-side temperature setting module to set the temperature in the driver-seat-side air-conditioning zone to a desired temperature, and includes an up switch and a down switch. The passenger-seat-side temperature setting switch is a passenger-seat-side temperature setting module to set the temperature in the passenger-seat-side air-conditioning zone to a desired temperature, and includes an up switch and a down switch. The fuel economy enhancement switch is an economy switch that gives an instruction on whether the operation rate of the compressor 6 of the refrigerating cycle is reduced to perform economical air-conditioning control in consideration of low fuel consumption and power saving.

The air-conditioning controller 10 is internally provided with a known microcomputer including functions of a central processing unit performing arithmetic processing or a control process, a memory, an I/O port, and the like. A sensor signal from a sensor (SENSOR) 61 is subjected to A/D conversion by the I/O port or an A/D conversion circuit, and then received by the microcomputer.

Specifically, the air-conditioning controller 10 is connected to an inside-air temperature sensor, which is generally referred to as sensor 61, as an inside-air temperature detection module that detects vehicle interior temperature (inside-air temperature). The air-conditioning controller 10 is further connected to an outside-air temperature sensor as an outside-air temperature detection module that detects vehicle exterior temperature (outside-air temperature), an insolation sensor as an insolation detection module, and the like.

There are provided an after-evaporation temperature sensor 38 as an after-evaporation temperature detection module that detects temperature of air that has just passed through the evaporator 31, and a cooling water temperature sensor as a cooling water temperature detection module that detects temperature of engine cooling water of a vehicle. There is further provided a humidity sensor as a humidity detection module that detects relative humidity in the vehicle interior. There is further provided a refrigerant pressure sensor that is attached between the receiver and the expansion valve on a high-pressure side of the refrigerating cycle, and detects a pressure on the high-pressure side.

The humidity sensor is accommodated together with the inside-air temperature sensor in a recess provided on the front surface of the instrument panel of the driver seat. The recess is closed by a cap having a vent. The inside-air temperature sensor, the outside-air temperature sensor, the after-evaporation temperature sensor, and the cooling water temperature sensor each employ a thermosensor such as a thermistor. The insolation sensor includes a driver-seat-side insolation intensity detection module (for example, photodiode) that detects the amount of insolation applied into the driver-seat-side air-conditioning zone, and a passenger-seat-side insolation intensity detection module that detects the amount of insolation applied into the passenger-seat-side air-conditioning zone.

The basic arithmetic control by the air-conditioning controller 10 is now described with reference to FIG. 5. FIG. 5 is a flowchart illustrating an example of the basic control module 200 including a control program of the air-conditioning controller 10. When the ignition switch is turned on and thus DC power is supplied to the air-conditioning controller 10, execution of the control program beforehand stored in ROM is started. At this time, the air-conditioning controller 10 initializes the content of a memory (RAM) for data processing incorporated in the microcomputer within the air-conditioning controller 10 (step S51).

Subsequently, the air-conditioning controller 10 reads various data into the memory. Specifically, in step S52, the air-conditioning controller 10 receives switching signals from various operating switches on the air-conditioning control panel 60 and sensor signals from various sensors.

The air-conditioning controller 10 receives an output signal corresponding to the vehicle interior temperature as a detection value of the inside-air temperature sensor, an output signal corresponding to the outside-air temperature as a detection value of the outside-air temperature sensor, and an output signal corresponding to the insolation amount as a detection value of the insolation sensor. The air-conditioning controller 10 receives an output signal corresponding to the after-evaporation temperature as a detection value of the after-evaporation temperature sensor 38, and an output signal corresponding to the cooling water temperature as a detection value of the cooling water temperature sensor.

The air-conditioning controller 10 calculates target blow-off temperature (TARGET TEMP) on each of the driver seat side and the passenger seat side based on the stored data and arithmetic expression as described above (step S53). The air-conditioning controller 10 calculates the blower air volume based on the target blowoff temperatures on the driver seat side and the passenger seat side obtained in step S53 (step S54). The blower air volume is indicated by blower voltage (BLOWER VOLT.) applied to the blower motor 4.

The air-conditioning controller 10 calculates the air mix opening degree (A/M OPENING) of the driver-seat-side air mix door 36 and the air mix opening degree of the passenger-seat-side air mix door 37 based on the stored data and arithmetic expression as described above (step S55). At this time, the target blowoff temperatures on the driver seat side and the passenger seat side are based on those obtained in step S53.

The air-conditioning controller 10 performs window defogging control (WINDOW DEFOG) (step S56). The air-conditioning controller 10 determines the target discharge amount of the compressor 6 through feedback control (PI control) such that the target after-evaporation temperature (TEO) determined in the above-described step corresponds to the actual after-evaporation temperature (TE) as a detection value of the after-evaporation temperature sensor 38 (step S57). Specifically, the air-conditioning controller 10 controls rotational speed of the electric motor by an inverter. In case of using an electromagnetic volume control valve, the air-conditioning controller 10 calculates a solenoid current (control current: In) as a target value of a control current supplied to an electromagnetic solenoid based on the stored arithmetic expression.

The air-conditioning controller 10 outputs a control signal to the blower motor 4 in FIG. 4 such that the blower control voltage determined in step S54 is given (step S58). The air-conditioning controller 10 outputs a control signal to each of the servo motors 63 and 64 such that the air mix opening degree determined in step S55 is given (step S59).

The air-conditioning controller 10 outputs a control signal to each of the servo motors 48, 49, 58, and 59 such that the outlet mode determined in step S56 is given (step S60). The air-conditioning controller 10 controls the rotational frequency of the electric motor such that the compressor control amount determined in step S57 is given (step S61). In case of using an electromagnetic volume control valve, the air-conditioning controller 10 outputs a control signal (step S61). Subsequently, the air-conditioning controller 10 returns to the control process of step S52.

As described above, the air-conditioning controller 10 performs the basic arithmetic control of the air-conditioning control. The basic control module 200, which is a known module, performs such arithmetic control in the air-conditioning controller 10. The basic control module 200 reads data from the sensor 61, and then, as described above, performs calculation of the blower control voltage determining the air volume of the blower 24, calculation of the compressor control amount determining the rotational frequency of the compressor 6, and calculation of the outlet switching control that switches the blowoff mode of the outlet.

Figure 6:
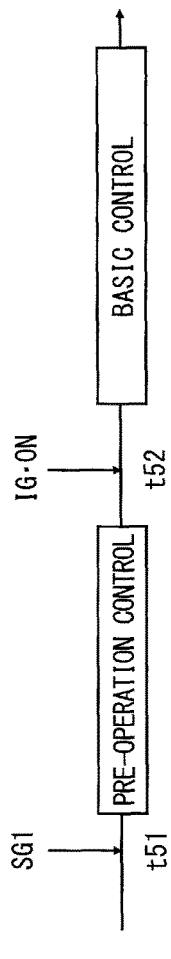
FIG. 6 is a time chart illustrating the basic control and the preliminary operation control.

Return to FIG. 1, the preliminary operation control module 20 performs control in a stage before operation of the basic control module 200 of the air-conditioning controller 10. FIG. 6 illustrates a temporal relationship between the basic control (BASIC CONTROL) process and a plurality of preliminary operation controls (PRELIMINARY CONTROL) in the first embodiment.

A vehicle door is wirelessly unlocked at time t51 through operation of the wireless key 2, and the entry plan signal SG1 is supplied to each of the control circuits configuring the preliminary operation control module 20 before entry of a driver. Thus, the preliminary operation control by the preliminary operation control module 20 that operates the preliminary operation device 30 is performed at or after time t51. Subsequently, a driver enters the vehicle and detects vehicle activation IG•ON at time t52, and the air-conditioning controller 10 starts the basic control at time t52.

In the first embodiment, a short-term preparatory control is selected as the preliminary operation control from among the controls of the devices on the air-conditioning before entry of the driver. The preliminary operation control is therefore finished after limited-time current application. Hence, power consumption required for the preliminary operation control is limited while preparation for the basic control after entry of the driver is provided by the preliminary operation control. The preliminary operation control module 20 is provided by a controller that can control the device 30 to be in a predetermined condition without starting the air-conditioning controller 10. The air-conditioning controller 10 is also provided by a controller.

For such controllers, the module and/or the function provided by each controller can be provided by software recorded in a substantive memory unit and a computer executing the software, the software only, the hardware only, or a combination thereof. For example, when the controller is provided by an electronic circuit as the hardware, the controller can be provided by a digital circuit including a large number of logic circuits or an analog circuit.

The preliminary operation control module 20 and the air-conditioning controller 10 can be provided by separate controllers. The preliminary operation control module 20 and the air-conditioning controller 10 may be disposed in one container. The preliminary operation control module 20 and the air-conditioning controller 10 may be provided by the same type of controller while being separated from each other. In one desirable embodiment, a controller providing the preliminary operation control module 20 is small in size and low in power consumption compared with a controller providing the air-conditioning controller 10.

Examples of a usable controller in the first embodiment include an electronic control unit. The controller includes at least one arithmetic processing unit (CPU), and at least one memory unit (MMR) as a storage medium that stores programs and data. The controller is provided by a microcomputer having a computer-readable storage medium. The storage medium non-temporarily stores a computer-readable program. The storage medium may be provided by a semiconductor memory or a magnetic disc. The controller may be provided by a set of computer resources linked by one computer or a data communication unit. The program executed by a controller allows the controller to function as the controller described herein such that the method described herein is performed.

The controller provides versatile elements. At least some of such elements can be termed module for performing a function. From another perspective, at least some of such elements can be termed block, module, or section understood as a configuration.

(Functions and Effects of First Embodiment)

In the first embodiment, the vehicle air-conditioning system includes the entry detection module 1 that detects possible entry of a driver before actual entry of the driver and transmits the entry plan signal SG1. The vehicle air-conditioning system further includes part of the vehicle air-conditioner 100 performing air-conditioning of the vehicle interior with air-conditioning air passing through the air-conditioning duct 22, and includes the preliminary operation device that operates before entry of the driver. The vehicle air-conditioning system further includes the preliminary operation control module 20 that notices the entry plan signal SG1 and then operates the preliminary operation device 30.

The preliminary operation device 30 includes at least one of the blower motor 4, the outlet motor 5, the compressor 6, and the electric heater 7. The blower motor 4 is to blow off air into the vehicle interior. The outlet motor 5 is to switch the outlet blowing off air into the vehicle interior. The compressor 6 discharges the refrigerant for air-conditioning of the vehicle interior. The electric heater 7 warms up the vehicle interior when a current is applied thereto.

The preliminary operation control module 20 includes at least one of the blower air-volume switching control module 11, the outlet switching control module 12, the compressor control module 13, and the electric-heater control module 14.

When the blower motor 4 is included, the blower air-volume switching control module 11 drives the blower motor 4 for the beforehand set blower drive time T1 (3 to 10 sec). The blower air-volume switching control module 11 exhausts air from the air-conditioning duct 22 to the outside, and then stops the blower motor 4.

The blower drive time must be set depending on the current rotational frequency of the blower. The blower drive time must be longer with smaller exhaust capacity or higher air temperature in the air-conditioning duct. In other words, the blower is operated for a beforehand calculated time depending on a condition of the blower. This minimizes the operation time of the preliminary operation device, and reduces energy loss if the preliminary operation becomes useless.

When the outlet motor 5 is included, the outlet switching control module 12 sets the outlet, which is an exit of air blown off through operation of the blower motor 4, at a position other than a position of the face blowoff blowing off the air toward a driver face, and is then held on standby while applying no current to the blower motor 4.

As described above, the outlet switching doors 44 to 46 and 54 to 56 are provided within the first and second air passageways 32 and 33, respectively, and independently set the driver-seat-side outlet mode and the passenger-seat-side outlet mode in the vehicle interior. The outlet switching doors 44 to 46 and 54 to 56 are the mode switching doors that are driven by the servo motors 48, 49, 58, and 59 to switch the respective outlet modes on the driver seat side and the passenger seat side, and configure the air-volume rate control module.

The respective driver-seat-side and passenger-seat-side outlet modes include the face mode, the bi-level mode, the foot mode, the foot defroster mode, and the defroster mode. The outlet switching doors 44 and 54 can open or close the driver-seat-side defroster outlet 40 and the passenger-seat-side defroster outlet 50, respectively, independently of each other. The servo motors 48 and 58 driving such doors configure an actuator as a defogging module that performs control effective in preventing or removing fog or frost on a window.

Operation time of the outlet motor 5 varies depending on a position of the outlet switching door. For example, if the basic control is desired to be performed while the outlet switching door allows air to be blown out from the face outlet, a condition that air is blown out from the face outlet is desirably beforehand set.

For example, if the previous exit has been performed while the outlet switching door is at the bi-level position, the condition that air is blown out from the face outlet can be set in a preliminary operation time of about 1 sec. If the previous exit is performed while the outlet switching door has been at the foot outlet position, the condition that air is blown out from the face outlet can be set in a preliminary operation time of about 5 sec.

Specifically, the door actuator is operated for a beforehand calculated time depending on a condition (position) of the outlet switching door. This minimizes the operation time of the preliminary operation device, and reduces energy loss if the preliminary operation becomes useless.

If the basic control is desired to be performed while the outlet switching door allows air to be blown out from the foot outlet, a condition that air is blown out from the foot outlet is beforehand set. The operation time of the preliminary operation device can be calculated from a map that is beforehand established based on a condition (position) of the outlet switching door as the preliminary operation device and a condition (position) of the outlet switching door for the basic control.

In another method, the preliminary operation control module operates the preliminary operation device 30 until the preliminary operation device 30 reaches a beforehand set position. In such a case, the preliminary operation device can be operated until reaching the target position without specifying the operation time. The preliminary operation control module detects, by a limit switch or the like, that the preliminary operation device reaches the target position, and stops operation of the preliminary operation device.

When the compressor 6 is included, the compressor control module 13 drives the compressor 6 for a beforehand set compressor drive time T2 (2 to 10 sec) to discharge the liquid refrigerant from the compressor 6, and then stops the compressor 6.

When the electric heater 7 is included, the electric-heater control module 14 applies a current to the electric heater 7 for a beforehand set electric-heater operation time T3 (5 to 60 sec) to warm up a vehicle interior, and then stops the current application to the electric heater 7.

Thus, the preliminary operation control module includes one of the air-volume switching control module, the outlet switching control module, the compressor control module, and the electric-heater control module. Hence, the vehicle air conditioner 100 can be partially operated by such modules before entry of a driver to prepare for regular air-conditioning control after entry of the driver.

In an existing typical pre-air-conditioning control, one of drive of the blower motor, drive of the outlet motor, drive of the compressor, and current application to the electric heater is also performed. However, the first embodiment is different from the pre-air-conditioning control in that time of the preliminary operation control for the blower is short, T1 (3 to 10 sec), or in that the preliminary operation control for the outlet motor sets the outlet at the position other than the face blowoff position and is held on standby while applying no current to the blower motor.

The first embodiment is different from the existing pre-air-conditioning control in that time of compressor driving as the preliminary operation control for liquid refrigerant discharge is short, T2 (2 to 10 sec), and in that time of current application to the electric heater is also short, T3 (5 to 60 sec). Hence, even if a driver cancels entry while one of the preliminary operation controls is performed based on a driver entry plan, less energy is lost in the preliminary operation control. Consequently, although the preliminary operation control is started before entry of a driver instead of starting control of the vehicle air-conditioner 100 after entry of the driver, less energy is lost in the preliminary operation control when the driver cancels entry.

The first embodiment further includes operation of the basic control module 200 (FIG. 5). In the basic control module 200, the air-conditioning controller 10 performs, after step S52 of reading data from the sensor 61, a blower control voltage step S54 of determining air volume of at least the blower motor 4. The air-conditioning controller 10 further performs a compressor control amount step S57 of determining the rotational frequency of the compressor 6, and an outlet switching door control step S60 of switching the blowoff mode. The preliminary operation control module 20 is performed in a stage before operation of the basic control module 200.

Consequently, the preliminary operation control module, which operates the preliminary operation device in response to a detection signal from the entry detection module, operates in a stage before the basic control module 200 is performed; hence, the preliminary operation control can be performed without significant modification of the existing basic control module 200. In addition, since the preliminary operation control module operates in a stage before the basic control module 200 is performed, the preliminary operation device can be quickly operated in response to the entry plan signal.

In the first embodiment, the preliminary operation control module 20 is provided separately from the basic control module 200 at a position away from the basic control module 200 in a vehicle. The entry plan signal SG1 is received by the preliminary operation control module 20.

Thus, the preliminary operation control module 20 is provided in addition to the traditionally used basic control module 200, thereby control by the basic control module 200 and control by the preliminary operation control module 20 can be easily performed. Since the entry plan signal from the entry detection module is received by the preliminary operation control module 20, control by the preliminary operation control module 20 can be promptly performed without waiting operation of the basic control module 200.

In the first embodiment, the preliminary operation control module 20 is provided integrally with the preliminary operation device 30. Consequently, the preliminary operation control module 20 can be installed together with the preliminary operation device 30.

Specifically, the preliminary operation control module 20 is provided in one of the circuit board for the control circuit controlling the blower motor 4, the circuit board for the control circuit controlling the outlet motor 5, the circuit board for the control circuit controlling the compressor 6, and the circuit board for the current application circuit controlling current application to the electric heater 7.

Consequently, one of the blower motor, the outlet motor, the compressor, and the electric heater, for each of which the preliminary operation control module is provided in the circuit board, is used, thereby the preliminary operation control module 20 can be easily provided.

Second Embodiment

A second embodiment is now described. In the following embodiments, the same components as those in the first embodiment are designated by the same numerals, and only different configurations are described while duplicated description is omitted. In the second or subsequent embodiments, the same numeral as in the first embodiment indicates the same configuration, and previous description is used as reference.

Figure 7:
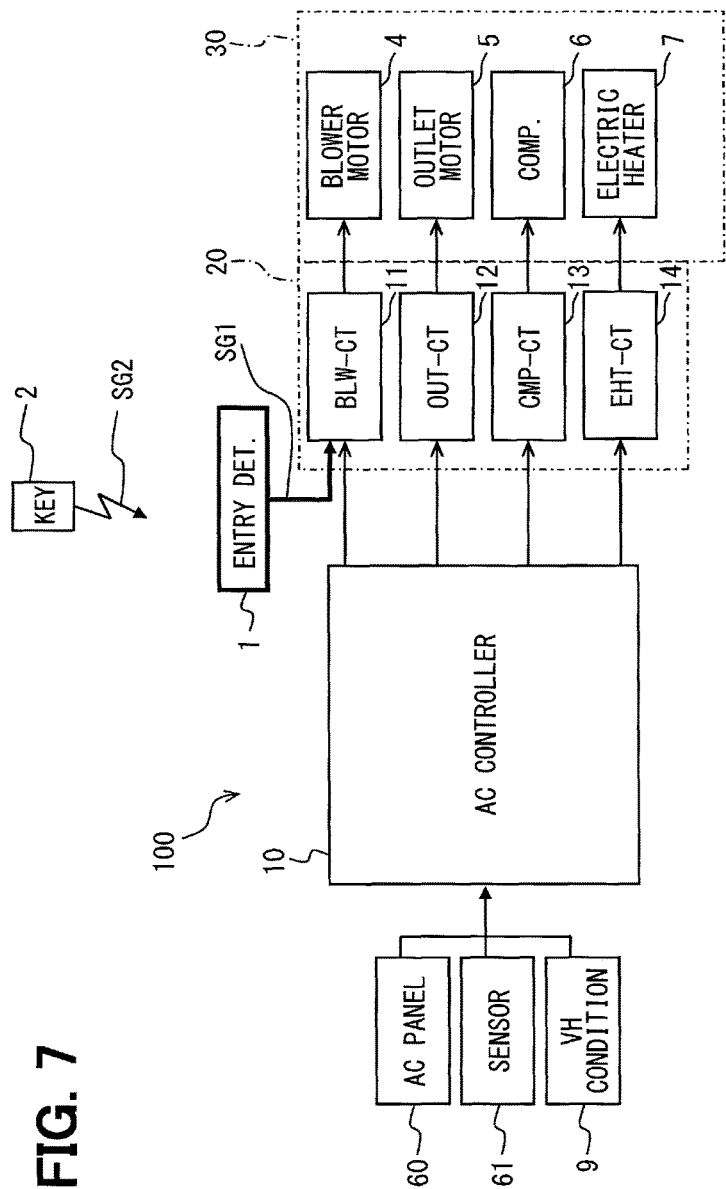
FIG. 7 is a block diagram of a vehicle air-conditioning system of a second embodiment.

FIG. 7 illustrates a vehicle air-conditioning system showing the second embodiment. In the second embodiment, the blower preliminary operation control is performed in response to the entry plan signal SG1. In the second embodiment, the blower motor 4 is driven for a beforehand set blower drive time. Consequently, air is exhausted from the air-conditioning duct 22 to the outside, and then the blower motor 4 is stopped.

The preliminary operation control can be performed on one preliminary operation device 30. Although the outlet switching control module 12, the compressor control module 13, and the electric-heater control module 14 are not necessary, the modules may be provided as illustrated in FIG. 7 such that a preliminary operation device 30 to be operated or a destination of the entry plan signal SG1 can be selected.

Figure 8:
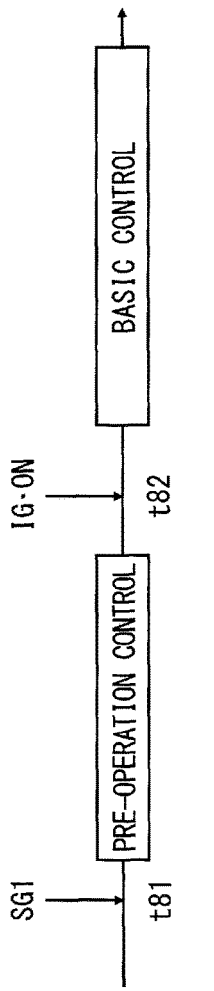
FIG. 8 is a time chart illustrating the basic control and the preliminary operation control.

FIG. 8 illustrates a temporal relationship between a basic control and a preliminary operation control in the second embodiment. The preliminary operation control is referred to as exhaust control. A vehicle door is wirelessly unlocked through operation of the wireless key. In response to such unlocking, the entry plan signal SG1 is supplied to a control circuit as the air-volume switching control module 11 at time t81 before entry of a driver. Consequently, the blower motor 4 is operated to exhaust air and moisture from the air-conditioning duct 22 to the outside. Subsequently, a driver enters and activates the vehicle at time t82, and the basic control is started at the time t82. At this time, the moisture and the like have been already exhausted from the air-conditioning duct 22 to the outside; hence, discomfort feeling of the driver is suppressed.

(Functions and Effects of Second Embodiment)

According to the second embodiment, functions and effects similar to those in the first embodiment are provided on the preliminary operation control for the blower motor 4.

Third Embodiment

Figure 9:
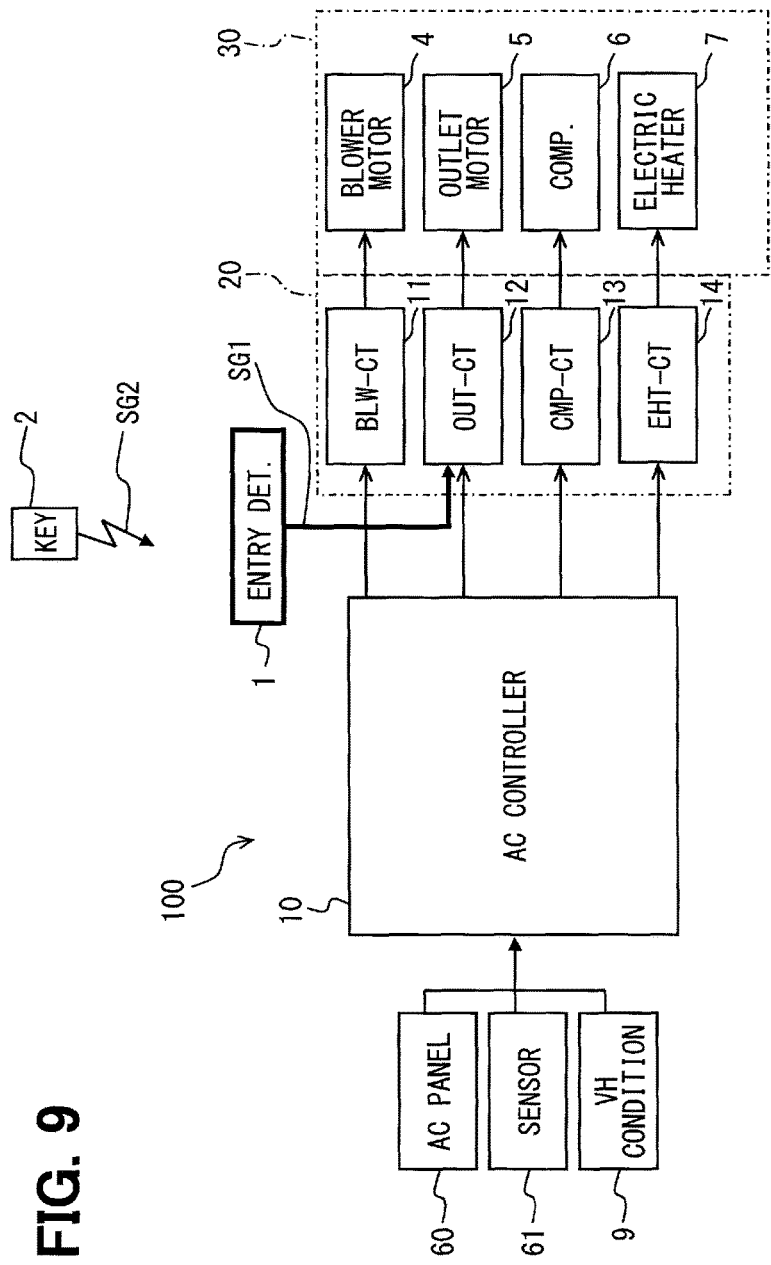
FIG. 9 is a block diagram of a vehicle air-conditioning system of a third embodiment.

A third embodiment is now described. The description is made on a portion different from that in the above-described embodiments. FIG. 9 illustrates a vehicle air-conditioning system showing the third embodiment. The outlet switching control module 12 detects the entry plan signal SG1. Before driver entry, the outlet switching control module 12 sets the outlet to defroster blowoff, which blows off air-conditioning air toward a window from each of the driver-seat-side defroster outlet 40 and the passenger-seat-side defroster outlet 50 illustrated in FIG. 4.

Since such setting is to prevent the air-conditioning air from blowing against a driver face in an early stage of the air-conditioning, the outlet mode should be set to a mode other than a mode of the driver-seat-side center face outlet 41 and a mode of the passenger-seat-side center face outlet 51.

Figure 10:
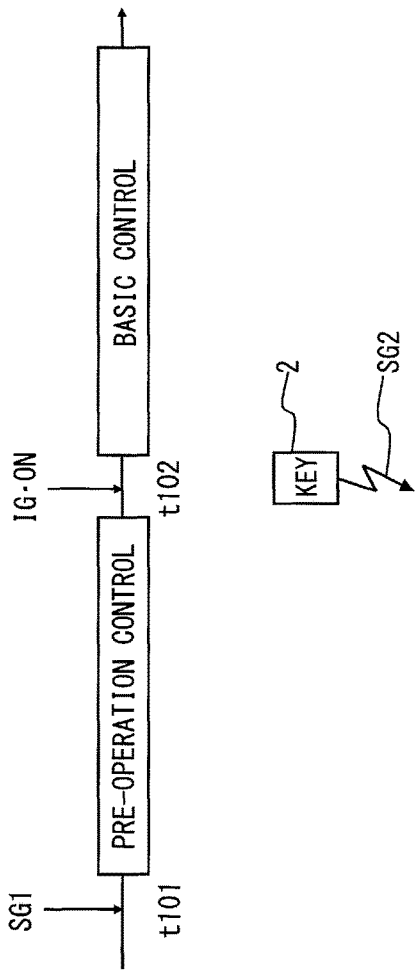
FIG. 10 is a time chart illustrating the basic control and the preliminary operation control.

FIG. 10 illustrates a temporal relationship between the basic control and the preliminary operation control. In the third embodiment, according to the entry plan signal SG1, an outlet servo motor is driven to set the outlet such that air blown off from the inside of the air-conditioning duct is blown off from an outlet other than the face outlet so as not to be directed to the driver face. Such preliminary operation control is performed on the servo motors 48, 49, 58, and 59 that drive the outlet switching doors.

A vehicle door is wirelessly unlocked through operation of the wireless key. In response to such unlocking, the entry plan signal SG1 is supplied to a control circuit as the outlet switching control module 12 before entry of a driver. Consequently, the outlet motor 5, which drives the switching door for the outlet, is operated at time t101. The outlet motor 5 is a general term of one of the servo motors 48, 49, 58, and 59 in FIG. 4. The outlet is set such that the air-conditioning air is blown off from an outlet other than the face outlet, for example, the driver-seat-side defroster outlet 40 or the passenger-seat-side defroster outlet 50. The outlet switching control module 12 sets the outlet at a position other than a position of the face blowoff blowing off the air toward a driver face, and is held on standby while applying no current to the blower motor 4.

Subsequently, the driver enters and activates the vehicle at time t102, and the basic control is performed at time t102. At this time, since the outlet mode has been already set to the defroster blowoff mode, air-conditioning air, which is blown off from the air-conditioning duct in an early stage of air-conditioning, is not directly blown against the driver face, resulting in suppression of discomfort feeling of the driver.

(Functions and Effects of Third Embodiment)

According to the third embodiment, functions and effects similar to those in the first embodiment are provided on the preliminary operation control for the outlet.

Fourth Embodiment

A fourth embodiment is now described. The description is made on a portion different from that in the above-described embodiments. In the fourth embodiment, the compressor control module detects the entry plan signal. Before driver entry, the compressor control module drives the compressor for a predetermined short time to discharge a liquid refrigerant from the compressor to the outside.

Figure 11:
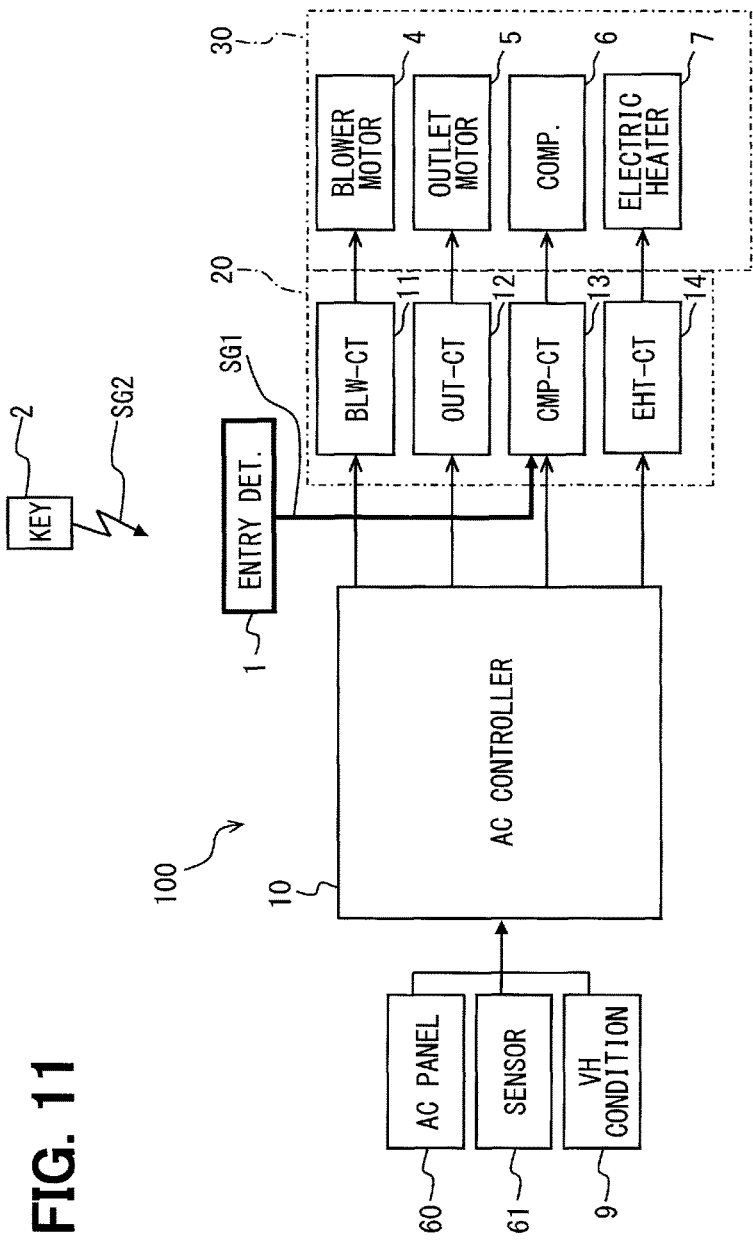
FIG. 11 is a block diagram of a vehicle air-conditioning system of a fourth embodiment.

FIG. 11 illustrates a vehicle air-conditioning system showing the fourth embodiment. The compressor control module drives the compressor 6 in response to the entry plan signal SG1, and thereby discharges the liquid refrigerant left in the compressor 6 into refrigerant piping outside of the compressor 6.

The preliminary operation control is performed on the electric motor driving the compressor 6. The electric motor is configured of a three-phase AC motor driven by an inverter. Hence, a circuit as the compressor control module 13 of the preliminary operation control module 20 can be mounted within a control circuit of the inverter.

Figure 12:
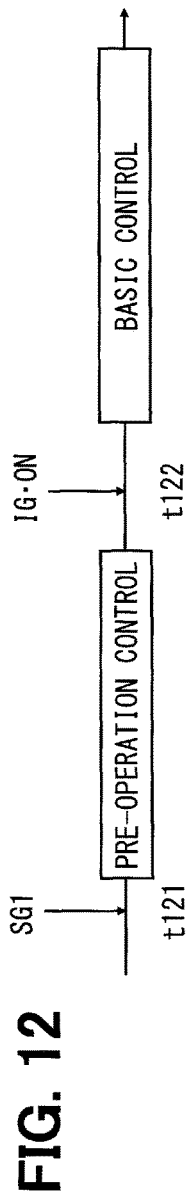
FIG. 12 is a time chart illustrating the basic control and the preliminary operation control.

FIG. 12 illustrates a temporal relationship between the basic control and the preliminary operation control. A vehicle door is wirelessly unlocked through operation of the wireless key. In response to such unlocking, the entry plan signal SG1 is supplied to the control circuit in the inverter at time t121 before entry of a driver. Consequently, the electric motor driving the compressor 6 is operated, so that the liquid refrigerant is discharged from the compressor 6.

Subsequently, if the driver enters and activates the vehicle, the basic control is performed. At this time, since the liquid refrigerant has been already discharged from the compressor 6, power for starting the compressor 6 is reduced. Thermoregulation of the vehicle interior is also performed in an early stage.

(Functions and Effects of Fourth Embodiment)

According to the fourth embodiment, functions and effects similar to those in the first embodiment are provided on the preliminary operation control for the compressor 6.

Fifth Embodiment

A fifth embodiment is now described. The description is made on a portion different from that in the above-described embodiments. In the first embodiment, the entry plan signal is directly sent to the control circuit as the outlet switching control module, the control circuit as the compressor control module, and the control circuit as the electric-heater control module. In the fifth embodiment, the entry plan signal is first sent to one of the preliminary operation control modules, and is then sequentially sent to other preliminary operation control modules from the one preliminary operation control module.

Figure 13:
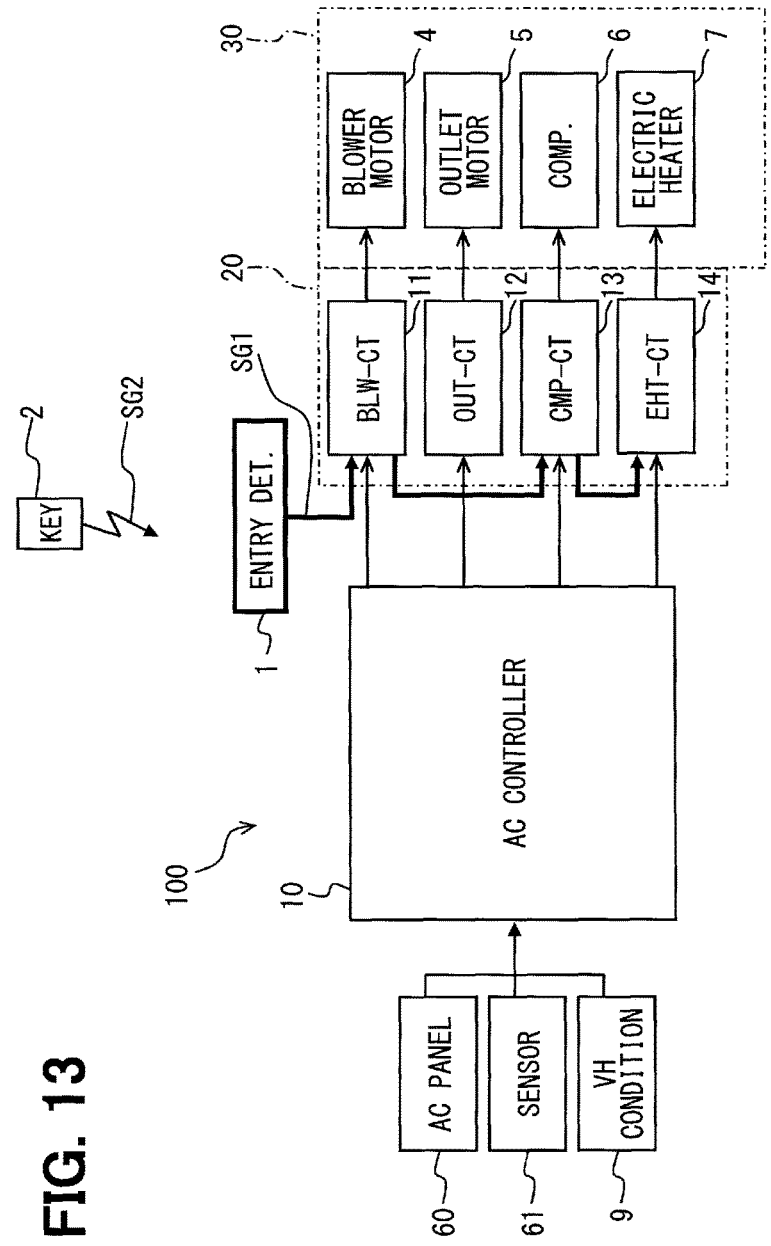
FIG. 13 is a block diagram of a vehicle air-conditioning system of a fifth embodiment.

FIG. 13 illustrates the fifth embodiment of the vehicle air-conditioning system. The fifth embodiment includes the entry detection module 1 and the wireless key 2, the entry detection module 1 detecting possible entry of a driver before actual entry of the driver and giving the entry plan signal SG1.

The fifth embodiment also employs the vehicle air-conditioner 100 illustrated in FIG. 4.

The entry plan signal SG1 is first sent to the blower air-volume switching control module 11. Subsequently, the entry plan signal SG1 is sequentially transferred to other preliminary operation control modules 20, i.e., the outlet switching control module 12, the compressor control module 13, and the electric-heater control module 14. Hereinafter, such signaling is referred to as token passing. In token passing, the entry plan signal SG1 can be always transmitted to one preliminary operation control module 20 at a time.

Figure 14:
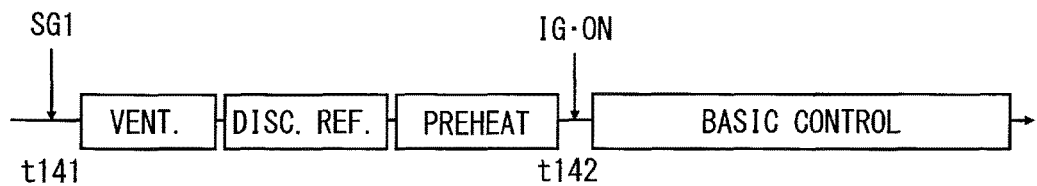
FIG. 14 is a time chart illustrating the basic control and the preliminary operation control.

FIG. 14 illustrates a temporal relationship between the basic control and the preliminary operation control. A control flowchart is described with reference to FIG. 14 and FIG. 2 as reference. The blower air-volume switching control module 11 performs the processing illustrated in FIG. 2, i.e., the preliminary operation control for the blower 24.

When the preliminary operation control for the blower 24 is finished, the entry plan signal SG1 is transmitted from the blower air-volume switching control module 11 to the compressor control module 13. The compressor 6 in the preliminary operation device 30 starts the preliminary operation control in response to the entry plan signal SG1. The compressor control module 13 performs the processing illustrated in FIG. 2, i.e., the preliminary operation control for the compressor 6.

If the vehicle is not activated yet, the liquid refrigerant is discharged from the compressor 6 into the refrigerant piping, and then the entry plan signal SG1 is sent from the compressor control module 13 to the electric-heater control module 14. The electric heater 7 starts the preliminary operation control in response to the entry plan signal SG1. The electric-heater control module 14 performs the processing illustrated in FIG. 2, i.e., the preliminary operation control for the electric heater 7.

In FIG. 14, the entry plan signal SG1 is transmitted by the door locking unit at time t141, and then the entry plan signal SG1 is in turn transmitted through token passing, thereby the preliminary operation controls are in turn performed.

First, moisture is exhausted from the air-conditioning duct 22 through the preliminary operation control for the blower motor 4. When current application to the blower motor 4 is stopped, the liquid refrigerant is discharged from the compressor 6. When current application to the compressor 6 is stopped, a current is applied to the electric heater 7, and then the current application is stopped. If a driver enters the vehicle and operates the ignition switch to activate the vehicle while one of the preliminary operation controls is performed, the basic control is performed. For example, all the preliminary operation controls have been finished and IG •ON is detected at time t142.

In this way, the preliminary operation controls are sequentially, i.e., not concurrently, performed; hence, electric load is temporally dispersed, so that power load for activation can be reduced. If the driver enters the vehicle at an earlier timing, for example, during the preliminary operation control for the electric heater, and if the ignition switch is turned on, the preliminary operation control for the electric heater 7 is immediately finished. However, the effects by the previously performed blower preliminary operation control and compressor preliminary operation control can be provided. Although the air-volume switching control module is not used as the preliminary operation control module in the fifth embodiment, it may also be used for the preliminary operation control.

(Functions and Effects of Fifth Embodiment)

According to the fifth embodiment, functions and effects similar to those in the first embodiment are provided on the preliminary operation controls for the blower motor 4, the compressor 6, and the electric heater 7. Furthermore, the preliminary operation controls are sequentially performed, leading to additional advantageous effects.

In the fifth embodiment, when a previous preliminary operation control for one device has been finished, the preliminary operation control module 20 starts a subsequent preliminary operation control for another device. The preliminary operation control module 20 does not concurrently operate the blower motor 4 and the compressor 6. Specifically, the preliminary operation control module 20 controls the operation timing of the blower motor 4 to be different from the operation timing of the compressor 6. In other words, the preliminary operation control module 20 controls the operation period of the blower motor 4 to be offset from the operation period of the compressor 6 so as to avoid overlap of the two operation periods. From another standpoint, the preliminary operation control module 20 controls the operation start timing of the blower motor 4 to be different from the operation start timing of the compressor 6. In other words, the preliminary operation control module 20 controls such operation start timings to be offset from each other.

According to the fifth embodiment, unlike the typical pre-air-conditioning control, blower operation and compressor operation are not concurrently performed; hence, even if a driver cancels entry while one of the preliminary operation devices is operated, less energy is lost. Consequently, it is possible to provide a vehicle air-conditioning system and a method of starting the vehicle air-conditioning system, in each of which although the preliminary operation control is started before entry of a driver instead of controlling the vehicle air-conditioner 100 after entry of the driver, less energy is lost in the preliminary operation control when the driver cancels entry. In the typical pre-air-conditioning control, at least both the compressor and the blower are concurrently operated. In the typical pre-air-conditioning control, when a driver cancels entry during the control, much energy is lost as a result of concurrent operation of the compressor and the blower. In the fifth embodiment, however, energy loss can be reduced.

The preliminary operation control module 20 performs control while a delay time is set for the preliminary operation control module 20, the delay time allowing the operation start timing of the blower motor 4 and the operation start timing of the compressor 6 to be offset from each other such that either operation start is delayed at least 2 sec. The entry plan signal SG1 is transmitted by the door locking unit, and is then in turn sent through token passing, and thus a subsequent preliminary operation control is in turn performed. This necessarily results in setting of the delay time.

Consequently, since the operation start timing of the blower is offset from the operation start timing of the compressor unlike the typical pre-air-conditioning control, even if a driver cancels entry while one of the preliminary operation devices is operated, less energy is lost. Thus, it is possible to provide a vehicle air-conditioning system and a method of starting the vehicle air-conditioning system, in each of which although control is started before entry of a driver instead of controlling the vehicle air-conditioner after entry of the driver, less energy is lost in the control when the driver cancels entry. In the typical pre-air-conditioning control, at least the compressor and the blower are substantially concurrently operated, and a timer module setting the delay time is not provided. In the typical pre-air-conditioning control, therefore, when a driver cancels entry during the control, much energy is lost as a result of concurrent operation start of the compressor and the blower. In the fifth embodiment, however, energy can be saved.

Sixth Embodiment

A sixth embodiment is now described. The description is made on a portion different from that in the above-described embodiments. In the first embodiment, the entry plan signal is directly sent to the control circuit as the air-volume switching control module, the control circuit as the outlet switching control module, the control circuit as the compressor control module, and the control circuit as the electric-heater control module. In addition, the preliminary operation controls are concurrently performed. In the sixth embodiment, the preliminary operation controls are performed with time lags being set, the time lags being controlled by a timer module.

Figure 15:
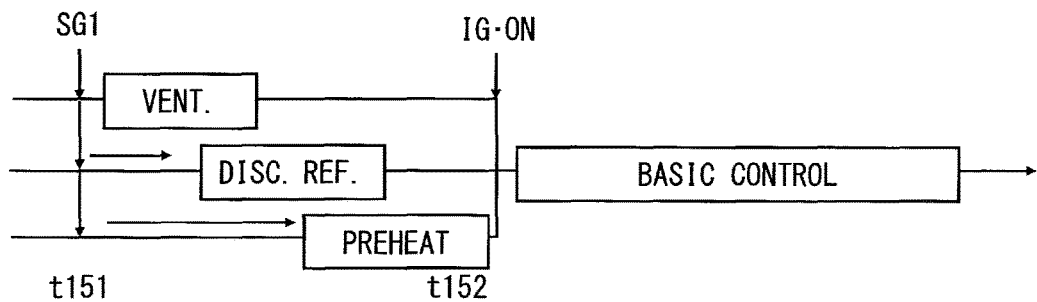
FIG. 15 is a time chart illustrating the basic control and the preliminary operation control in a sixth embodiment.

FIG. 15 illustrates a temporal relationship between the basic control and the preliminary operation control. In the sixth embodiment, the entry plan signal SG1 is simultaneously sent to the blower air-volume switching control module 11, the compressor control module 13, and the electric-heater control module 14. Different delay times are set for the timer modules provided in the respective preliminary operation control modules 20, thereby time lags are set between the operation start times of the preliminary operation controls.

In other words, the preliminary operation control module 20 do not simultaneously start. The entry plan signal SG1 is received at time t151, and the blower air-volume switching control module 11 starts with a first delay time (for example, 0 (zero)) at the time t151. Subsequently, the compressor control module 13 starts after a delay of a second delay time. Furthermore, the electric-heater control module 14 starts after a delay of a third delay time. A driver enters a vehicle and turns on the ignition switch at time t152, and thus the basic control is performed. If the ignition switch is turned on during operation of the electric-heater control module 14, the preliminary operation control for the electric heater 7 is immediately stopped.

(Functions and Effects of Sixth Embodiment)

According to the sixth embodiment, functions and effects similar to those in the first embodiment are provided on the preliminary operation controls for the blower motor 4, the compressor 6, and the electric heater 7. Furthermore, the preliminary operation controls are sequentially performed, which provides additional advantageous effects.

A delay time is set for the preliminary operation control module 20 so that either operation start is delayed at least 2 sec so as to be intentionally shifted such that the operation start timing of the blower motor 4 is different from the operation start timing of the compressor 6. In the sixth embodiment, operation periods of the preliminary operation devices partially overlap with one another.

Thus, blower operation start and compressor operation start are not concurrently performed unlike the typical pre-air-conditioning control; hence, even if a driver cancels entry while one of the preliminary operation devices is operated, less energy is lost. In this way, it is possible to provide a vehicle air-conditioning system and a method of starting the vehicle air-conditioning system, in each of which although control is started before entry of a driver instead of controlling the vehicle air-conditioner after entry of the driver, less energy is lost in the control when the driver cancels entry. In the typical pre-air-conditioning control, at least both the compressor and the blower are substantially concurrently operated. In the typical pre-air-conditioning control, when a driver cancels entry during the control, much energy is lost as a result of concurrent operation start of the compressor and the blower. In the sixth embodiment, however, energy loss can be reduced.

Seventh Embodiment

A seventh embodiment is now described. The description is made on a portion different from that in the above-described embodiments. In the seventh embodiment, when a plurality of preliminary operation controls are performed with time lags, a preliminary operation control, which has a shortest time from control start to control end, is first performed. In other words, the preliminary operation controls are performed in ascending order of time required for each control.

Figure 16:
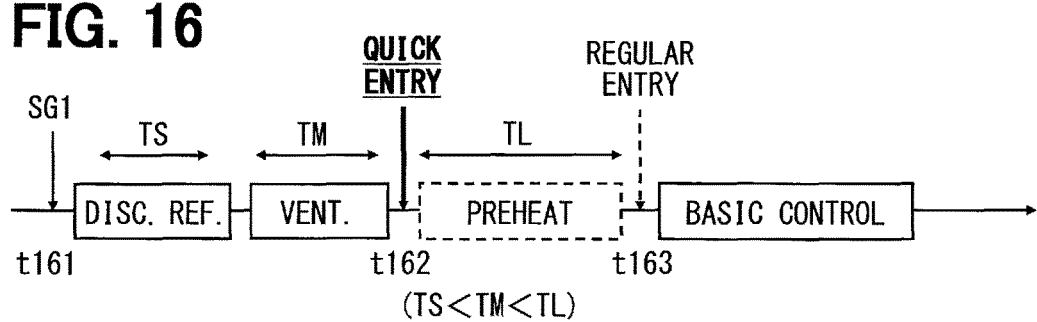
FIG. 16 is a time chart illustrating the basic control and the preliminary operation control in a seventh embodiment.

FIG. 16 illustrates a temporal relationship between the basic control and the preliminary operation control. The preliminary operation control for the compressor, which has a shortest time TS from control start to control end, is performed at time t161. That is, the compressor control module 13 first performs the preliminary operation control for 3 sec. As a result, the liquid refrigerant is discharged from the compressor 6. Subsequently, the preliminary operation control for the blower, which has a medium time TM from control start to control end, is performed. That is, the blower air-volume switching control module 11 operates for 4 sec to exhaust air, desirably moisture, from the air-conditioning duct 22. Finally, the preliminary operation control for the electric heater, which has a longest time TL from control start to control end, is performed at time t162. That is, the electric-heater control module 14 operates for 5 sec to preheat the electric heater 7. After that, a driver enters a vehicle as usual at time t163, and the basic control is performed.

If a driver enters a vehicle and turns on the ignition switch at early timing such as time t162 for some reason, the basic control is performed rather than the preliminary operation control for the electric heater. However, if a driver performs such early entry, the preliminary operation control for each of the compressor and the blower can also be performed, i.e., as many preliminary operation controls as possible are performed, leading to improvement in comfortability.

(Functions and Effects of Seventh Embodiment)

According to the seventh embodiment, functions and effects similar to those in the first embodiment are provided on the preliminary operation controls for the blower motor 4, the compressor 6, and the electric heater 7. Furthermore, the preliminary operation controls are performed in ascending order of execution-required time, leading to additional advantageous effects.

In the seventh embodiment, control is first performed on the preliminary operation device 30 having the shortest time from control start to control end among the devices included in the preliminary operation device 30. Consequently, even if time from noticing a driver entry plan by the entry plan signal to actual driver entry is short, as many preliminary operation devices as possible can be performed.

Eighth Embodiment

An eighth embodiment is now described. The description is made on a portion different from that in the above-described embodiments. In the eighth embodiment, when a plurality of preliminary operation controls are performed with time lags, a preliminary operation control with minimum power consumption is first performed.

Figure 17:
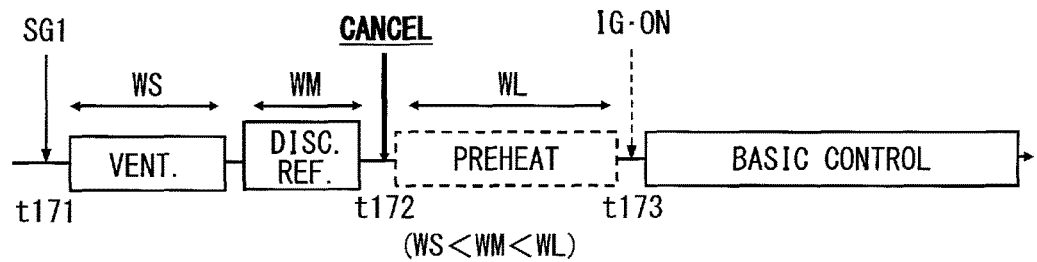
FIG. 17 is a time chart illustrating the basic control and the preliminary operation control in an eighth embodiment.

FIG. 17 illustrates a temporal relationship between the basic control and the preliminary operation control. Control is first performed by the blower air-volume switching control module 11 that performs the preliminary operation control for the blower with minimum power consumption WS. Subsequently, control is performed by the compressor control module 13 that performs the preliminary operation control for the compressor with medium power consumption WM. Finally, control is performed by the electric-heater control module 14 that performs the preliminary operation control for the electric heater with a largest power consumption WL.

The entry plan signal SG1 is received by the preliminary operation control module 20 at time t171. First, the preliminary operation control for the blower is performed, so that air, desirably moisture, is exhausted from the air-conditioning duct 22.

Subsequently, the preliminary operation control for the compressor 6 is performed, so that the liquid refrigerant is discharged from the compressor 6. Finally, the preliminary operation control for the electric heater is performed at time t172, and thus the electric heater 7 is preheated. Subsequently, a driver enters a vehicle as usual at time t173, and the basic control is performed.

If a driver enters a vehicle and turns on the ignition switch at early timing such as time t172 for some reason, the basic control is performed rather than preheating by the electric-heater control module 14. However, if a driver performs such early entry, the preliminary operation control for each of the blower and the compressor can also be performed, i.e., as many preliminary operation controls as possible are performed, leading to improvement in comfortability.

(Functions and Effects of Eighth Embodiment)

In the eighth embodiment, control is first performed on the preliminary operation device 30 with the minimum power consumption among the devices included in the preliminary operation device 30. Consequently, even if a driver entry plan is cancelled, power consumption lost for the previous preliminary operation controls can be reduced. Cancel of the entry plan is detected by, for example, repeated locking operation, and is received by the preliminary operation control module 20.

Ninth Embodiment

A ninth embodiment is now described. The description is made on a portion different from that in the above-described embodiments. In the first embodiment, the air-conditioning controller includes the basic control module performing the basic control. The preliminary operation control module performing the preliminary operation control has been provided separately from the basic control module at a position away from the basic control module in a vehicle.

Figure 18:
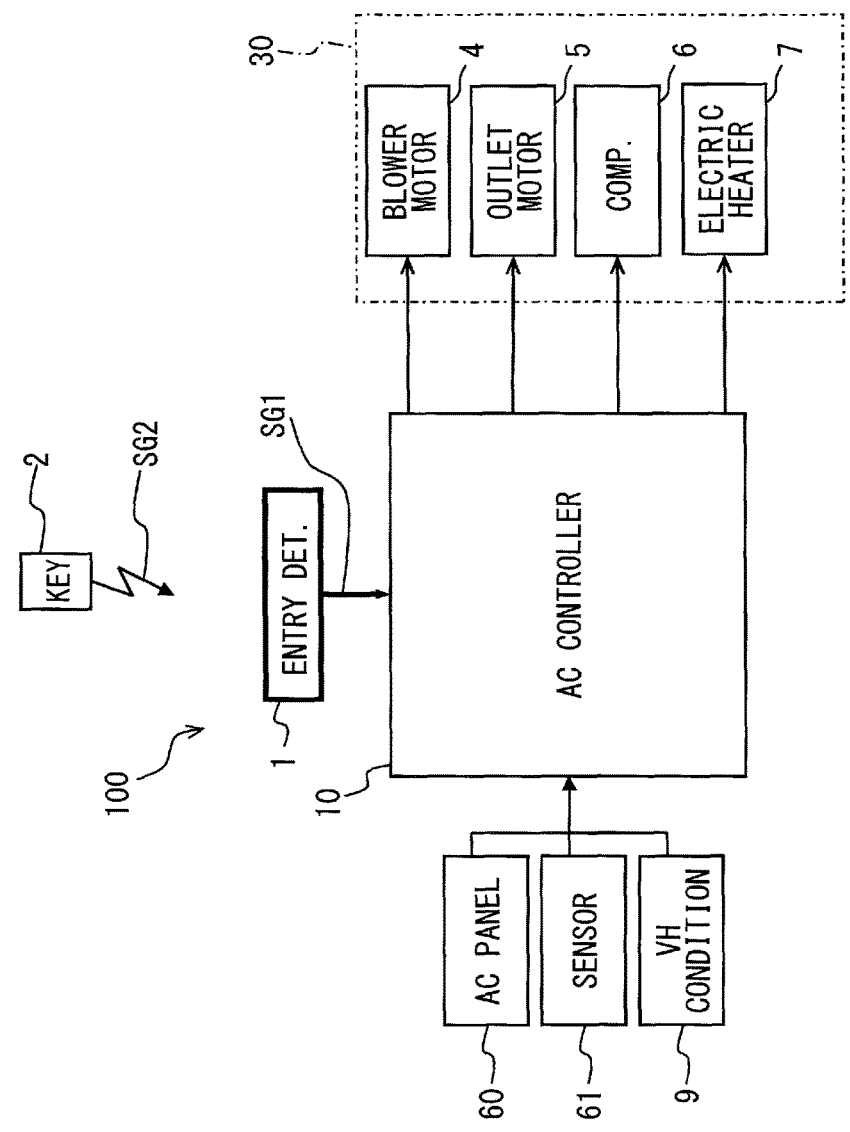
FIG. 18 is a block diagram of a vehicle air-conditioning system of a ninth embodiment.
Figure 19:
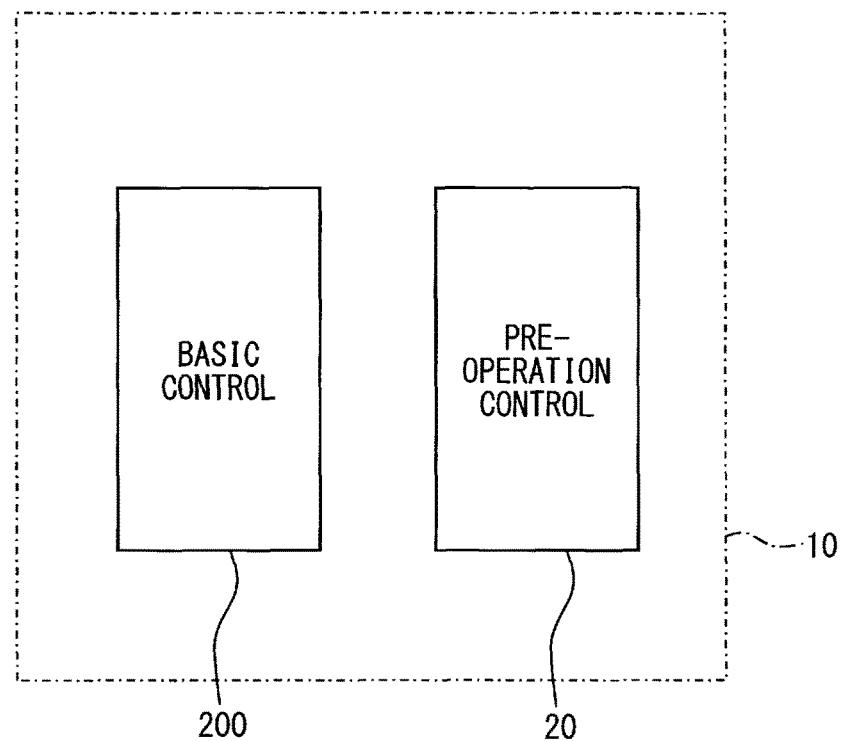
FIG. 19 is a block diagram illustrating a basic control module and a preliminary operation control module.

In addition, the entry plan signal from the entry detection module has been received by the preliminary operation control module. FIG. 18 illustrates a vehicle air-conditioning system of the ninth embodiment. FIG. 19 illustrates the preliminary operation control module 20 and the basic control module 200 each performing control in the air-conditioning controller 10.

The preliminary operation control module 20 and the basic control module 200 are provided in the air-conditioning controller 10. The entry plan signal SG1 is sent from the entry detection module 1 into the air-conditioning controller 10.

The air-conditioning controller 10 is connected to the air-conditioning control panel 60, various sensors 61, and the vehicle condition input module 9. The air-conditioning controller 10 includes therein the preliminary operation control module 20 including a control program or an electric circuit performing the control corresponding to the preliminary operation control module 20. The preliminary operation control module 20 directly supplies a control signal from the air-conditioning controller 10 to a device such as the blower motor 4 in response to the entry plan signal SG1. The control order is set such that the basic control is performed after the preliminary operation control. Although the preliminary operation control module 20 is implemented by a program different from that of the basic control module 200, but may be implemented by a circuit different from that of the basic control module 200. In such a case, the preliminary operation control module 20 may be implemented by a special logic circuit having high operation speed while the basic control module 200 is implemented by a microcomputer as well known.

(Functions and Effects of Ninth Embodiment)

In the ninth embodiment, the preliminary operation control module includes at least one of the air-volume switching control module, the outlet switching control module, the compressor control module, and the electric-heater control module.

Hence, the vehicle air conditioner 100 can be partially operated by such modules before entry of a driver to prepare for regular air-conditioning control after entry of the driver. In an existing typical pre-air-conditioning control, one of drive of the blower motor, drive of the outlet motor, drive of the compressor, and current application to the electric heater is also performed in order to set up a comfortable environment before entry of the driver. The ninth embodiment is different from the pre-air-conditioning control in that time of the preliminary operation control for the blower is short, T1 (3 to 10 sec). The ninth embodiment is different from the pre-air-conditioning control in that the preliminary operation control for the blower motor sets the outlet at the position other than the face blowoff position and is held on standby while applying no current to the blower motor.

The ninth embodiment is different from the pre-air-conditioning control in that time of compressor drive as the preliminary operation control for liquid refrigerant discharge is short, T2 (2 to 10 sec). Furthermore, the ninth embodiment is different from the pre-air-conditioning control in that time of current application to the electric heater is short, T3 (5 to 60 sec).

Hence, even if a driver cancels entry while one of the preliminary operation controls is performed based on a driver entry plan, energy loss is small. Consequently, it is possible to provide a vehicle air-conditioning system and a method of starting the vehicle air-conditioning system, in which although the preliminary operation control is started before entry of a driver instead of controlling the vehicle air-conditioner 100 after entry of the driver, less energy is lost in the preliminary operation control when the driver cancels entry.

In the ninth embodiment, the preliminary operation control, which operates the preliminary operation device in response to a detection signal from the entry detection module, is performed in a stage before the basic control module is performed; hence, the preliminary operation control can be performed without significant modification of the existing basic control module. In addition, since the preliminary operation control is performed in a stage before the basic control module is performed, the preliminary operation device can be quickly operated in response to the entry plan signal.

In the ninth embodiment, the basic control module 200 and the preliminary operation control module 20 are provided in a housing of the same air-conditioning controller 10. The entry plan signal SG1 is received by the air-conditioning controller 10. Thus, the preliminary operation control module is provided in addition to the basic control module in the traditionally used air-conditioning controller, thereby the basic control and the preliminary operation control can be easily performed. Since the entry plan signal is sent to the air-conditioning controller, the air-conditioning controller can transmit a control signal for a preliminary operation and a control signal for a regular air-conditioning control to each preliminary operation device.

Other Embodiments

Although the above-described embodiments have been described as preferred embodiments, the technology disclosed herein is not limited to such embodiments, and various modifications and alterations can be made within the scope without departing from the gist of the disclosure. The configurations of the above-described embodiments are merely shown as examples, and the scope of the technology disclosed herein is not limited to the scope of such description. The scope of the technology disclosed herein is defined by claims, and includes all modifications and alterations in the sense equivalent to or within the scope of claims.

In the above-described embodiments, the preliminary operation control module operates the actuator for driving the outlet switching door at a position other than the face blowoff position, for example, the defroster blowoff position. However, the outlet mode may be set to the foot mode blowing off air to a driver root or the foot defroster mode instead of the defroster blowoff mode.

Although the air-conditioning control has been exemplarily described with an automatic air conditioner in the above-described embodiments, the technology disclosed herein can also be carried out for a manual air conditioner. In the manual air conditioner, temperature setting, outlet selection, and blower air volume setting are manually performed.

Although the entry detection module is configured by the unlocking signal from the wireless key in the above-described embodiments, a signal for opening a front door or a garage door, a signal for automatic lighting of a garage inside illuminator, and a remote switch other than the wireless key can also be used. When a driver opens a vehicle door by a typical mechanical key to enter a vehicle, time from door opening to ignition switch turn-on is often long; hence a door opening signal in response to insertion of the mechanical key may be used as the entry plan signal for the entry detection module.

The refrigerating cycle may include not only the air-conditioner cycle but also a heat pump cycle. If the preliminary compressor control is not performed, the compressor 6 may not be an electromotive compressor, and the vehicle may be one of an electric car, a hybrid car, and a car driven by a typical internal combustion engine. The technology disclosed herein can also be applied to a vehicle air-conditioner performing the pre-air-conditioning control. In such a case, one of the pre-air-conditioning control and the preliminary operation control should be selectively switched by a remote controller for the pre-air-conditioning control, for example. If the pre-air-conditioning control is not used, the preliminary operation control may be performed.

A cancel switch as a cancel module may be provided between the entry detection module and the preliminary operation control module instead of performing all the preliminary operation controls when the entry plan signal is transmitted. The switch may be manually switched. The cancel module may be configured to automatically operate.

For example, it is detected by a signal from a navigation device that a short time elapses between parking and transmission of a next entry plan signal, or that a vehicle exists in a particular time zone and/or a particular place. In addition, the preliminary operation control may be automatically cancelled in the particular place. Specifically, the preliminary operation control may be automatically canceled for short shopping or the like through signal cutoff between the entry detection module and the preliminary operation control module in a place where a convenience store exists.

The preliminary operation control can be applied to other devices of the vehicle air-conditioner, in which switching operation is performed by operation of an electric actuator. For example, there can be performed a preliminary operation control for switching control of an outlet or inlet using an electric actuator, and a preliminary operation control for a posture switching control with an actuator that moves a seat in accordance with a driver constitution. When several types of electric heaters are equipped in a vehicle, switching of an electric heater to be used and a preliminary operation control thereof can be performed according to ambient temperature. For example, when a radiation electric heater, a viscous heater that generates frictional heat, and a combustion heater are provided, the switching and the preliminary operation control can be thus performed.

In other words, it is possible to perform the preliminary operation control for a device that requires a long time for operation or switching before exhibiting a regular effect. Consequently, at least some of pre-heating time in a period required before the driver feels a sense of warmth can be provided before entry of a driver.

The viscous heater and the combustion heater each require time before a heat transmitting medium (mainly engine cooling water) is warmed up. In addition, although the radiation electric heater requires no pre-heating time of a heat transmitting medium, it requires time before infrared energy is efficiently radiated. Hence, such time-requiring processes are performed by the preliminary operation controls, thereby comfortability can be quickly provided to a driver who has entered a vehicle.

Switching of an inlet of recirculation/fresh-air may be performed by the preliminary operation control in place of or in addition to the outlet switching control. For example, when ambient temperature is detected together with entry signal detection, and if an entry plan signal is transmitted at a low ambient temperature of a predetermined temperature or lower, a switching door of a recirculation/fresh-air switching unit may be switched to a recirculation-air side.

The invention claimed is:

1. A method of starting a vehicle air-conditioning system, comprising:
    an entry detection step of detecting possible entry of a driver before actual entry of the driver and transmitting an entry plan signal;
    a preliminary operation device that includes some of a vehicle air-conditioner performing air-conditioning of a vehicle interior with air-conditioning air passing through an air-conditioning duct, and operates before entry of the driver; and
    a preliminary operation control step of operating the preliminary operation device in response to the entry plan signal,
    wherein the preliminary operation device includes a blower motor to blow off air into the vehicle interior and a compressor that discharges a refrigerant for air-conditioning of the vehicle interior,
    wherein the preliminary operation control step includes
    a blower air-volume switching control step of driving the blower motor for a beforehand set blower drive time to exhaust air from the air-conditioning duct of the vehicle air-conditioner to the outside of the air-conditioning duct, and stopping the blower motor just after air is exhausted from the air-conditioning duct of the vehicle air-conditioner, and
    a compressor control step of driving the compressor for a beforehand set compressor drive time to discharge the liquid refrigerant from the compressor, and stopping the compressor just after the liquid refrigerant is discharged from the compressor, and
    wherein an operation period of the blower motor to be offset from an operation period of the compressor so as to avoid overlap of the two operation periods, and
    wherein both the blower air-volume switching control step and the compressor control step are different from a regular air-conditioning control after entry of the driver, and are performed before entry of the driver to prepare for the regular air-conditioning control after entry of the driver.

2. A method of starting a vehicle air-conditioning system, comprising:
    an entry detection step of detecting possible entry of a driver before actual entry of the driver and transmitting an entry plan signal;
    a preliminary operation device that includes some of a vehicle air-conditioner performing air-conditioning of a vehicle interior with air-conditioning air passing through an air-conditioning duct, and operates before entry of the driver; and
    a preliminary operation control step of operating the preliminary operation device in response to the entry plan signal,
    wherein the preliminary operation device includes a blower motor to blow off air into the vehicle interior and a compressor that discharges a refrigerant for air-conditioning of the vehicle interior, wherein the preliminary operation control step includes
a blower air-volume switching control step of driving the blower motor for a beforehand set blower drive time to exhaust air from the air-conditioning duct of the vehicle air-conditioner to the outside of the air-conditioning duct, and stopping the blower motor just after air is exhausted from the air-conditioning duct of the vehicle air-conditioner, and
a compressor control step of driving the compressor for a beforehand set compressor drive time to discharge the liquid refrigerant from the compressor, and stopping the compressor just after the liquid refrigerant is discharged from the compressor, and
wherein the preliminary operation control step performs control while setting a delay time that allows either operation start to be delayed at least 2 sec such that operation start timing of the blower motor is different from operation start timing of the compressor, and
wherein both the blower air-volume switching control step and the compressor control step are different from a regular air-conditioning control after entry of the driver, and are performed before entry of the driver to prepare for the regular air-conditioning control after entry of the driver.

3. The method of starting the vehicle air-conditioning system according to claim 1, further comprising an air-conditioning controller,
wherein the air-conditioning controller includes a basic control step performing
after a step of reading data from a sensor, a blower control step of determining air volume of at least the blower motor,
a compressor control step of determining rotational frequency of the compressor, and
an outlet switching door control step of switching a blowoff mode, and
wherein the preliminary operation control step is performed in a stage before operation of the basic control step.

4. The method of starting the vehicle air-conditioning system according to claim 2, further comprising an air-conditioning controller,
wherein the air-conditioning controller includes a basic control step performing
after a step of reading data from a sensor, a blower control step of determining air volume of at least the blower motor,
a compressor control step of determining rotational frequency of the compressor, and
an outlet switching door control step of switching a blowoff mode, and
wherein the preliminary operation control step is performed in a stage before operation of the basic control step.

5. The method of starting the vehicle air-conditioning system according to claim 2, wherein control is first performed on the device having a shortest time from control start to control end among the devices included in the preliminary operation device.

6. The method of starting the vehicle air-conditioning system according to claim 2, wherein control is first performed on the device consuming minimum power in the preliminary operation control step among the devices included in the preliminary operation device.

7. The method of starting the vehicle air-conditioning system according to claim 1, wherein control is first performed on the device having a shortest time from control start to control end among the devices included in the preliminary operation device.

8. The method of starting the vehicle air-conditioning system according to claim 1, wherein control is first performed on the device consuming minimum power in the preliminary operation control step among the devices included in the preliminary operation device.

9. A vehicle air-conditioning system, comprising:
an entry detection module that detects possible entry of a driver before actual entry of the driver and transmits an entry plan signal;
a preliminary operation device that includes some of a vehicle air-conditioner performing air-conditioning of a vehicle interior with air-conditioning air passing through an air-conditioning duct, and operates before entry of the driver; and
a preliminary operation control module that operates the preliminary operation device in response to the entry plan signal,
wherein the preliminary operation device includes a blower motor to blow off air into the vehicle interior and a compressor that discharges a refrigerant for air-conditioning of the vehicle interior,
wherein the preliminary operation control module includes
a blower air-volume switching control module that drives the blower motor for a beforehand set blower drive time to exhaust air from the air-conditioning duct of the vehicle air-conditioner to the outside of the air-conditioning duct, and stops the blower motor just after air is exhausted from the air-conditioning duct of the vehicle air-conditioner, and
a compressor control module that drives the compressor for a beforehand set compressor drive time to discharge the liquid refrigerant from the compressor, and stops the compressor just after the liquid refrigerant is discharged from the compressor, and
wherein the preliminary operation control module controls an operation period of the blower motor to be offset from an operation period of the compressor so as to avoid overlap of the two operation periods, and
wherein both the blower air-volume switching control module and the compressor control module are different from a regular air-conditioning control module to be activated after entry of the driver, and are activated before entry of the driver to prepare for the regular air-conditioning control module to be activated after entry of the driver.

10. A vehicle air-conditioning system, comprising:
an entry detection module that detects possible entry of a driver before actual entry of the driver and transmits an entry plan signal;
a preliminary operation device that includes some of a vehicle air-conditioner performing air-conditioning of a vehicle interior with air-conditioning air passing through an air-conditioning duct, and operates before entry of the driver; and
a preliminary operation control module that operates the preliminary operation device in response to the entry plan signal,
wherein the preliminary operation device includes a blower motor to blow off air into the vehicle interior and a compressor that discharges a refrigerant for air-conditioning of the vehicle interior,
wherein the preliminary operation control module includes a blower air-volume switching control module that drives the blower motor for a beforehand set blower drive time to exhaust air from the air-conditioning duct of the vehicle air-conditioner to the outside of the air-conditioning duct, and stops the blower motor just after air is exhausted from the air-conditioning duct of the vehicle air-conditioner, and a compressor control module that drives the compressor for a beforehand set compressor drive time to discharge the liquid refrigerant from the compressor, and stops the compressor just after the liquid refrigerant is discharged from the compressor, and wherein the preliminary operation control module controls operation start timing of the blower motor and operation start timing of the compressor to be different from each other, and wherein both the blower air-volume switching control module and the compressor control module are different from a regular air-conditioning control module to be activated after entry of the driver, and are activated before entry of the driver to prepare for the regular air-conditioning control module to be activated after entry of the driver.

* * * * *